United States Patent
Kim et al.

(10) Patent No.: US 9,743,447 B2
(45) Date of Patent: Aug. 22, 2017

(54) CONTROL METHOD AND DEVICE BASED ON MULTIPLE PRIORITIES IN WIRELESS COMMUNICATION SYSTEM

(71) Applicant: LG ELECTRONICS INC., Seoul (KR)

(72) Inventors: Jaehyun Kim, Anyang-si (KR); Laeyoung Kim, Anyang-si (KR); Taehyeon Kim, Anyang-si (KR); Hyunsook Kim, Anyang-si (KR)

(73) Assignee: LG Electronics Inc., Seoul (KR)

(*) Notice: Subject to any disclaimer, the term of this patent is extended or adjusted under 35 U.S.C. 154(b) by 72 days.

(21) Appl. No.: 13/744,145

(22) Filed: Jan. 17, 2013

(65) Prior Publication Data

US 2013/0182644 A1    Jul. 18, 2013

Related U.S. Application Data

(60) Provisional application No. 61/587,667, filed on Jan. 18, 2012, provisional application No. 61/639,077, filed on Apr. 27, 2012.

(51) Int. Cl.
*H04W 80/04* (2009.01)
*H04W 88/06* (2009.01)
(Continued)

(52) U.S. Cl.
CPC ......... *H04W 76/025* (2013.01); *H04W 4/005* (2013.01); *H04W 28/0215* (2013.01);
(Continued)

(58) Field of Classification Search
CPC . H04W 28/0215; H04W 36/14; H04W 80/04; H04W 88/06
(Continued)

(56) References Cited

U.S. PATENT DOCUMENTS

2006/0221986 A1    10/2006  Berg
2008/0089303 A1*    4/2008  Wirtanen et al. ............. 370/342
(Continued)

FOREIGN PATENT DOCUMENTS

CN    102098759 A    6/2011
CN    102111847 A    6/2011
(Continued)

OTHER PUBLICATIONS

Network Congetsion Control:Mechanism for Congestion Avoidnace and Recovery, By Rahul Vaidya et al. Juniper Networks.*
(Continued)

*Primary Examiner* — Andrew Chriss
*Assistant Examiner* — Voster Preval
(74) *Attorney, Agent, or Firm* — Dentons US LLP

(57) ABSTRACT

A wireless communication system is disclosed. More particularly, a control method and device based on multiple priorities in a wireless communication system is disclosed. The method of controlling a back-off timer in a terminal configured with multiple priorities, which includes transmitting a first non-access stratum (NAS) request message set to a first priority level, starting the back-off timer configured by a network, and transmitting a second NAS request message, which is not set to the first priority level, while the back-off timer runs.

8 Claims, 6 Drawing Sheets

(51) Int. Cl.
H04W 76/02 (2009.01)
H04W 28/02 (2009.01)
H04W 4/00 (2009.01)
H04W 76/06 (2009.01)
H04W 74/08 (2009.01)

(52) U.S. Cl.
CPC ...... H04W 74/0833 (2013.01); H04W 76/022 (2013.01); H04W 76/028 (2013.01); H04W 76/062 (2013.01)

(58) Field of Classification Search
USPC ........................................................ 370/328
See application file for complete search history.

(56) References Cited

U.S. PATENT DOCUMENTS

| | | | |
|---|---|---|---|
| 2009/0086705 | A1 | 4/2009 | Zisimopoulos et al. |
| 2010/0003999 | A1 | 1/2010 | Park et al. |
| 2010/0202307 | A1 | 8/2010 | Lee et al. |
| 2011/0069638 | A1 | 3/2011 | Ishizu et al. |
| 2011/0199905 | A1 | 8/2011 | Pinheiro et al. |
| 2011/0199987 | A1 | 8/2011 | Rommer et al. |
| 2012/0082029 | A1 | 4/2012 | Liao |
| 2012/0178457 | A1* | 7/2012 | Liao ............... H04W 76/027 455/437 |
| 2012/0252481 | A1 | 10/2012 | Anpat et al. |
| 2012/0257401 | A1* | 10/2012 | Wilfert ................. 362/511 |
| 2012/0275401 | A1* | 11/2012 | Sun .................. H04W 72/04 370/329 |
| 2013/0042011 | A1 | 2/2013 | Sugizaki et al. |
| 2013/0203399 | A1* | 8/2013 | Gupta ............... H04W 28/12 455/418 |

FOREIGN PATENT DOCUMENTS

| | | |
|---|---|---|
| CN | 102131270 A | 7/2011 |
| KR | 1020110093613 A | 8/2011 |
| WO | 2011065718 A2 | 6/2011 |
| WO | 2011087223 A2 | 7/2011 |
| WO | 2011098249 A2 | 8/2011 |
| WO | 2011129098 A1 | 10/2011 |
| WO | 2011150615 A1 | 12/2011 |
| WO | 2011156264 A2 | 12/2011 |

OTHER PUBLICATIONS

Network congetsion control: Mechanisms for congestion Avoidnace and Recovery Rahul Vaidya.*
Network congestion control: Mechanism for congetstion avaoidance and recovery Rahul Vaidya et al.*
Network congestion control:Mechanism for congestion avoidance and recovery Rahul Vaidya.*
Network congestion control: mechanisms for congestion avoidance and recovery Vaidya et al Dec. 2011.*
Pfaffenberger, Webster's New World Computer Dictionary, entry for "Central Processing Unit", Hungry Minds, Inc., Ninth Edition, 2001, p. 68.
QualComm: "Multiple PDP Contexts in UMTS", Engineering Services Group, XP-002428095, Aug. 28, 2006.
3GPP TS 24.301 (3rd Generation Partnership Project; Technical Specification Group Core Network and Terminals; Non-Access-Stratum (NAS) protocol for Evolved Packet System (EPS); Stage 3 (Release 10), Feb. 2011, p. 25.
3GPP TS 24.301 (3rd Generation Partnership Project; Technical Specification Group Core Network and Terminals; Non-Access-Stratum (NAS) protocol for Evolved Packet System (EPS); Stage 3 (Release 10), Feb. 2011, p. 17, 143.
3GPP TS 24.368 (3rd Generation Partnership Project; Technical Specification Group Core Network and Terminals; Non-Access-Stratum (NAS) configuration Management Object (MO) (Release 11), Sep. 2011, pp. 5-6.
Samsung, Change Request: "NAS backoff timer handling for UE with emergency services", 3GPP TSG SA WG2 Meeting #88e, S2-120205, Jan. 12-18, 2012.
Ericsson, ST-Ericsson, "SIMTC prioritization", 3GPP TSG SA WG2 Meeting #84, TD S2-111445, Apr. 11-15, 2011.
Panasonic, LG Electronics, Nokia Siemens Networks, Nokia, Change Request: "Correction and clarification on the terminologies of NAS level congestion control", 3GPP TSG CT WG1 Meeting #73, C1-113628, Aug. 22-26, 2011.
3GPP TS 23.401 V10.6.0 (Dec. 2011) Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 10).
"Network Congestion Control: Mechanisms for Congestion Avoidance and Recovery", Vaidya et al.
Rahul Vaidya et al., "Network Congestion Control: Mechanisms for Congestion Avoidance and Recovery", ACWR 11 Proceedings of the 1st International Conference on Wireless Technologies for Humanitarian Relief, ACM, Nov. 2011, pp. 199-207.

* cited by examiner

CONTROL METHOD AND DEVICE BASED ON MULTIPLE PRIORITIES IN WIRELESS COMMUNICATION SYSTEM

This application claims the benefit of U.S. Provisional Application Nos. 61/587,667, filed on Jan. 18, 2012 and 61/639,077 filed on Apr. 27, 2012, which are each hereby incorporated by reference as if fully set forth herein.

BACKGROUND OF THE INVENTION

Field of the Invention

The present invention relates to a wireless communication system, and more particularly, to a control method and device based on multiple priorities in a wireless communication system.

Discussion of the Related Art

Machine type communication (MTC) refers to a communication scheme between one or more machines and is also referred to as machine-to-machine (M2M) communication. Here, a machine refers to an entity which does not require direct human operation or intervention. For example, a device including a mobile communication module, such as a meter or a vending machine, may include a user equipment such as a smartphone which is capable of automatically accessing a network without operation/intervention of a user to perform communication. Various examples of such a machine are referred to as an MTC device or terminal in the present specification. That is, MTC refers to communication performed by one or more machines (that is, MTC devices) without human operation/intervention.

MTC may include communication (e.g., device-to-device (D2D) communication) between MTC devices and communication between an MTC device and an MTC application server. Examples of communication between an MTC device and an MTC application server include communication between a vending machine and a server, communication between a point of sale (POS) device and a server and an electric meter, and communication between a gas meter or a water meter and a server. AN MTC-based application may include security, transportation, healthcare, etc.

If congestion or overload occurs in a network, congestion control may be performed in a control plane. For example, network congestion control may be performed at a non-access stratum (NAS) level which is an uppermost stratum in a control plane between a terminal and a network control node in a radio interface. In general, if a network congestion occurs, a network may configure a back-off timer for inhibiting a request for a network for a predetermined time with respect to a terminal.

According to operation of a currently defined wireless communication system, priority may be configured per terminals, and only one of "(NAS signaling) low priority" for a terminal supporting MTC or "(NAS signaling) non-low priority" for a terminal supporting non-MTC. For a terminal supporting multiple priorities (including dual priorities), how to specifically configure multiple priorities for a terminal is not defined. Further, in a conventional wireless communication system, if network congestion or overload occurs and for terminals having different priorities, how to process packet data network (PDN) connection(s) is not defined.

In addition, if network congestion or overload occurs, a back-off timer (BOT) may be used in order to distribute network load. In the conventional wireless communication system, how to process the BOT with respect to a terminal having multiple priorities is not defined.

If multiple priorities are applied, in definition of the conventional wireless communication system, ambiguity of operation of a terminal and a network in a network congestion or overload state is present and an accurate service may not be provided. In particular, in a wireless communication system supporting MTC, since a network must provide a service to a large number of terminals (or MTC devices), ambiguity must not be present in processing of network congestion.

SUMMARY OF THE INVENTION

Accordingly, the present invention is directed to a control method and apparatus based on multiple priorities in a wireless communication system that substantially obviates one or more problems due to limitations and disadvantages of the related art.

An object of the present invention is to provide a method for controlling a packet data network (PDN) connection with respect to a terminal having multiple priorities.

Another object of the present invention is to provide a method for controlling a back-off timer (BOT) with respect to terminal having multiple priorities.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a back-off timer in a terminal configured with multiple priorities, which includes transmitting a first non-access stratum (NAS) request message set to a first priority level, starting the back-off timer configured by a network, and transmitting a second NAS request message, which is not set to the first priority level, while the back-off timer runs.

In another aspect of the present invention, provided herein is a terminal for controlling a back-off timer if multiple priorities are configured, which includes a transceiving module, and a processor. The processor transmits a first non-access stratum (NAS) request message set to a first priority level using the transceiving module, starts the back-off timer configured by a network, and transmits a second NAS request message, which is not set to the first priority level, using the transceiving module while the back-off timer runs.

The following matters are commonly applicable to the embodiments of the present invention.

The second NAS request message, which is not set to the first priority level, may be transmitted without stopping the back-off timer.

The back-off timer may start when the first NAS request message set to the first priority level is rejected by the network.

The first NAS request message set to the first priority level may be at least one of an attach request message, a tracking area update (TAU) request message or a service request message, and the back-off timer may be a mobility management (MM) back-off timer.

The second NAS request message, which is not set to the first priority level, may be associated with at least one of an attach process, a TAU process or a service request process, and start of at least one of the attach process, the TAU process or the service request process may be allowed while the MM back-off timer runs.

The first NAS request message set to the first priority level may be at least one of a packet data network (PDN) connection request message, a bearer modification request message or a bearer resource allocation message, and the back-off timer may be a session management (SM) back-off timer.

The second NAS request message, which is not set to the first priority level, may be at least one of a packet data network (PDN) connection request message, a bearer modification request message or a bearer resource allocation message.

The SM back-off timer may run with respect to a specific access point name (APN), and transmission of the PDN connection request message, which is not set to the first priority level, may be allowed with respect to the same APN as the specific APN.

If the SM back-off timer runs with respect to a specific access point name (APN) and a PDN connection established by the first NAS request message set to the first priority level is present, transmission of the bearer modification request message or the bearer resource allocation request message, which is not set to the first priority level, may be allowed with respect to the PDN connection.

The SM back-off timer is a back-off timer operating based on a bearer ID.

The first priority level may correspond to the case in which the terminal is configured with a NAS signaling low priority.

The multiple priorities of the terminal may be set by one or more of a non-access stratum (NAS) configuration management object (MO), application, or device triggering scheme.

The priority of the terminal may be a non-access stratum (NAS) priority.

The terminal may be a machine type communication (MTC) device.

The terminal configured with the multiple priorities may be a terminal configured with dual priorities.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
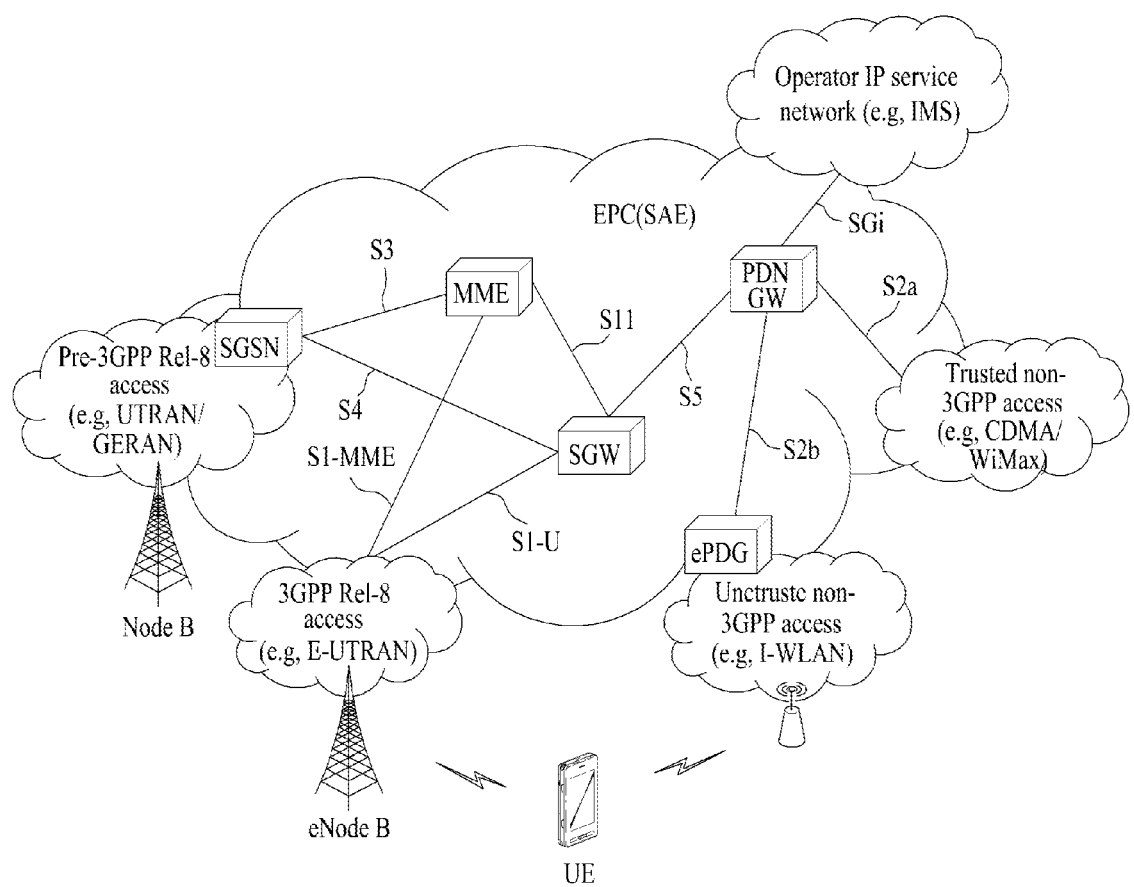
FIG. 1 is a diagram showing the schematic architecture of an evolved packet core (EPC)

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to others. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The embodiments of the present invention can be supported by the standard documents disclosed in any one of wireless access systems, such as an IEEE 802 system, a $3^{rd}$ Generation Partnership Project (3GPP) system, a 3GPP Long Term Evolution (LTE) and LTE-A system, and a 3GPP2 system. That is, the steps or portions, which are not described in order to make the technical spirit of the present invention clear, may be supported by the above documents. In addition, all the terms disclosed in the present document may be described by the above standard documents.

The following technologies may be used in various wireless communication systems. For clarity, 3GPP LTE and 3GPP LTE-A will be focused upon in the following description, but the scope of the present invention is not limited thereto.

Terms used in the present specification are as follows.
UMTS (universal mobile telecommunication system): Third generation mobile communication technology based on global system for mobile communication (GSM) developed by 3GPP.
EPS (evolved packet system): Network system including an evolved packet core (EPC) which is a packet switched (PS) core network based on internet protocol (IP) and an access network such as LTE/UTRAN, which is evolved from UMTS.
NodeB: Base station of GERAN/UTRAN, which is mounted outdoors and coverage of which forms a macro cell.
eNodeB: Base station of E-UTRAN, which is mounted outdoors and coverage of which forms a macro cell.
UE: User equipment. The UE may be referred to as a terminal, a mobile equipment (ME), a mobile station (MS), etc. In addition, the UE may be a portable apparatus such as a laptop, a mobile phone, a personal digital assistant (PDA), a smartphone and a multimedia apparatus or a non-portable apparatus such as a vehicle mounted apparatus. A UE or terminal may indicate an MTC device in MTC.

Home NodeB (HNB): Base station of a UMTS network, which is mounted indoors and coverage of which forms a micro cell.

Home eNodeB (HeNB): Base station of an EPS network, which is mounted indoors and coverage of which forms a micro cell.

MME (mobility management entity): Network node of an EPS network, which performs a mobility management (MM) function and a session management (SM) function.

PDN-GW (packet data network-gateway)/PGW: Network node of an EPS network, which performs a UE IP address allocation function, a packet screening and filtering function and a charging data collection function.

SGW (serving gateway): Network node of an EPS network, which performs mobility anchor, packet routing, idle mode packet buffering, triggering for enabling an MME to page a UE.

PCRF (policy and charging rule function): Network node of an EPS network, which performs policy decision for dynamically applying quality of service (QoS) and charging policy differentiated per service flow.

OMA DM (open mobile alliance device management): Protocol designed for management of mobile devices such as a mobile phone, a PDA or a portable computer, which performs functions such as device configuration, firmware upgrade, error report, etc.

OAM (operation administration and maintenance): OAM is a set of network administration functions for providing network fault display, performance information, data and diagnostic functions.

NAS (non-access stratum): Upper stratum of a control plane between a UE and an MME. This is a functional layer for signaling between a UE and a core network and exchanging a traffic message in an LTE/UMTS protocol stack, supports UE mobility, and supports a session management procedure for establishing and maintaining an IP connection between a UE and a PDN GW.

NAS configuration MO (NAS configuration management object): MO used to configure parameters associated with NAS functionality with respect to a UE.

SIPTO (selected IP traffic offload): Scheme for transmitting specific IP traffic through a public network such as the Internet instead of an operator network when transmitting the specific IP traffic through an H(e)NB or a macro cell. In a 3GPP release-10 system, an operator selects a PDN-GW which is physically close to a UE in an EPC network and supports handover of user traffic.

PDN (packet data network): Network in which a server supporting a specific service (e.g., a multimedia messaging service (MMS) server, a wireless application protocol (WAP) server, etc.) is located.

PDN connection: Logical connection between a UE and a PDN, which is expressed by one IP address (one IPv4 address and/or one IPv6 prefix).

APN (Access Point Name): String indicating or identifying a PDN. A requested service or a network (PDN) is accessed through a PGW and the APN is the name (string) previously defined in the network in order to find the PGW. For example, the APN may be expressed by internet.mnc012.mcc345.gprs.

IMS (IP multimedia subsystem): Subsystem for providing a multimedia service based on IP.

MTC (machine type communications): Communication performed by a machine without human intervention.

MTC device: UE (e.g., a vending machine, a meter, etc.) which has a communication function through a core network and serves a specific purpose.

MTC-IWF (MTC interworking function): Entity serving as a gateway for transmitting a control signal or data for MTC through a 3GPP network including EPS or IMS.

SCS (service capability server): Server connected to a 3GPP network for communication with an MTC device using an MTC-IWF and an MTC device located in a home public land mobile network (HPLMN). The SCS provides capability for utilizing one or a plurality of applications.

MTC server: Server on a network for managing an MTC terminal, which may be located inside or outside a mobile communication network and may have an interface accessible by an MTC user. The MTC server may provide an MTC associated service to other servers (an SCS) and may be an MTC application server.

MTC application: Service to which MTC is applied (e.g., remote metering, product movement tracking, etc.).

MTC application server: Server on a network in which an MTC application is executed.

MTC feature: Function of a network supporting an MTC application. For example, MTC monitoring is a feature for preparing for equipment loss in an MTC application such as remote metering and low mobility is a feature for an MTC application for an MTC device such as a vending machine.

MTC subscriber: Entity which is connected to a network operator and provides a service to one or more MTC terminals.

MTC group: Group of MTC terminals which share at least one MTC feature and belong to an MTC subscriber.

RAN (radio access network): Unit including a NodeB, an eNodeB and a radio network controller for controlling the NodeB and the eNodeB in a 3GPP network, which is present between UEs and provides connection to a core network.

HLR (home location register)/HSS (home subscriber server): Database having subscriber information in a 3GPP network. The HSS may perform functions such as configuration storage, identity management and user state storage.

PLMN (public land mobile network): Network configured for the purpose of providing a mobile communication service to individuals. This network may be configured on a per operator basis.

NAS level congestion control: Congestion or overload control function of an EPS network composed of APN based congestion control and general NAS level mobility management control.

MM back-off timer (mobility management back-off timer): Mobility management back-off timer used to control congestion when congestion occurs in a network. While the MM back-off timer runs, a UE is set so as not to perform attach, location information update (e.g., tracking area update (TAU)), routing area update (RAU), service request/extended service request, etc. (in case of an emergency bearer service, a paging response in an existing region, or a multimedia priority service (MPS), even when the MM back-off timer runs, the UE is set to make a request).

SM back-off timer (session management back-off timer): Session control back-off timer used to control congestion when congestion occurs in a network. While the SM back-off timer runs, a UE is set so as not to perform establishment or change of a session based on an associated APN, etc. (in case of an emergency bearer service or an MPS, even when the SM back-off timer runs, the UE is set to make a request).

TA (tracking area): Registration area of a terminal in an EPS network. The TA is identified by a tracking area identity (TAI).

RA (routing area): Registration area of a terminal for a packet core network domain in a GPRS/UMTS network. The RA is identified by a routing area identity (RAI).

Hereinafter, a description will be given based on the above-described terms.

FIG. 1 is a diagram showing the schematic architecture of an evolved packet core (EPC).

The EPC is a fundamental element of system architecture evolution (SAE) for improving 3GPP performance. SAE corresponds to a research project for deciding a network structure supporting mobility between various types of networks. SAE aims to provide an optimized packet-based system which supports various radio access technologies based on IP and provides improved data transfer capabilities.

More specifically, the EPC is a core network of an IP mobile communication system for a 3GPP LTE system and may support a packet-based real-time and non-real-time service. In the existing mobile communication system (that is, a second or third generation mobile communication system), a core network function was implemented through two distinct sub-domains of a voice network (a circuit-switched (CS) network) and a data network (a packet-switched (PS) network). In a 3GPP LTE system which is evolved from the third generation communication system, sub-domains of a CS network and a PS network were unified into one IP domain. That is, in a 3GPP LTE system, a terminal having IP capability and a terminal may be connected through an IP based base station (e.g., an eNodeB (evolved Node B)), an EPC, an application domain (e.g., an IMS)). That is, the EPC is a structure necessary to implement an end-to-end IP service.

The EPC may include various components. FIG. 1 shows a serving gateway (SGW), a packet data network gateway (PDN GW), a mobility management entity (MME), a serving GPRS (general packet radio service) (SGSN) supporting node and an enhanced packet data gateway (ePDG).

The SGW operates as a boundary point between a radio access network (RAN) and a core network and is an element which performs a function for maintaining a data path between an eNodeB and a PDG GW. In addition, if a terminal moves over a region served by an eNodeB, the SGW serves as a local mobility anchor point. That is, packets may be routed through the SGW for mobility in an evolved UMTS terrestrial radio access network (E-UTRAN) defined after 3GPP release-8. In addition, the SGW may serve as an anchor point for mobility of another 3GPP network (an RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an untrusted network such as an interworking wireless local area network (I-WLAN) and a trusted network such as a code division multiple access (CDMA) or WiMAX network).

Although the SGW and the PDN GW are configured as separate gateways in the example of the network structure of FIG. 1, the two gateways may be implemented according to a single gateway configuration option.

The MME performs signaling and control functions in order to support access to network connection of a UE, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., GPRS networks).

The ePDG serves as a security node for a non-3GPP network (e.g., an I-WLAN, a Wi-Fi hotspot, etc.).

As described with reference to FIG. 1, a terminal having IP capabilities may access an IP service network (e.g., an IMS) provided by an operator through various elements in the EPC based on 3GPP access or non-3GPP access.

FIG. 1 shows various reference points (e.g., S1-U, S1-MME, etc.). In the 3GPP system, a conceptual link connecting two functions present in different functional entities of an E-UTRAN and an EPC is defined as a reference point. Table 1 shows the reference points shown in FIG. 1. In addition to the example of Table 1, various reference points may be present according to network structure.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | Reference point between MME and SGSN. Enables user and bearer information exchange for inter 3GPP access network mobility in idle and/or active state. This reference point can be used intra-PLMN or inter-PLMN (e.g. in the case of Inter-PLMN HO). |
| S4 | Reference between SGW and SGSN. Provides related control and mobility support between GPRS Core and the 3GPP Anchor function of Serving GW. |

TABLE 1-continued

| Reference point | Description |
|---|---|
| | In addition, if Direct Tunnel is not established, it provides user plane tunneling. |
| S5 | Reference point for providing user plane tunneling and tunnel management between Serving GW and PDN GW. Used for Serving GW relocation due to UE mobility and if the Serving GW needs to connect to a non-co-located PDN GW for the required PDN connectivity. |
| S11 | Reference point between MME and SGW |
| SGi | Reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to a non-3GPP interface. S2a is a reference point for providing associated control between the trusted non-3GPP access and the PDNGW and mobility support to a user plane. S2b is a reference point for providing associated control between the ePDG and the PDNGW and mobility support to a user plane.

Figure 2:
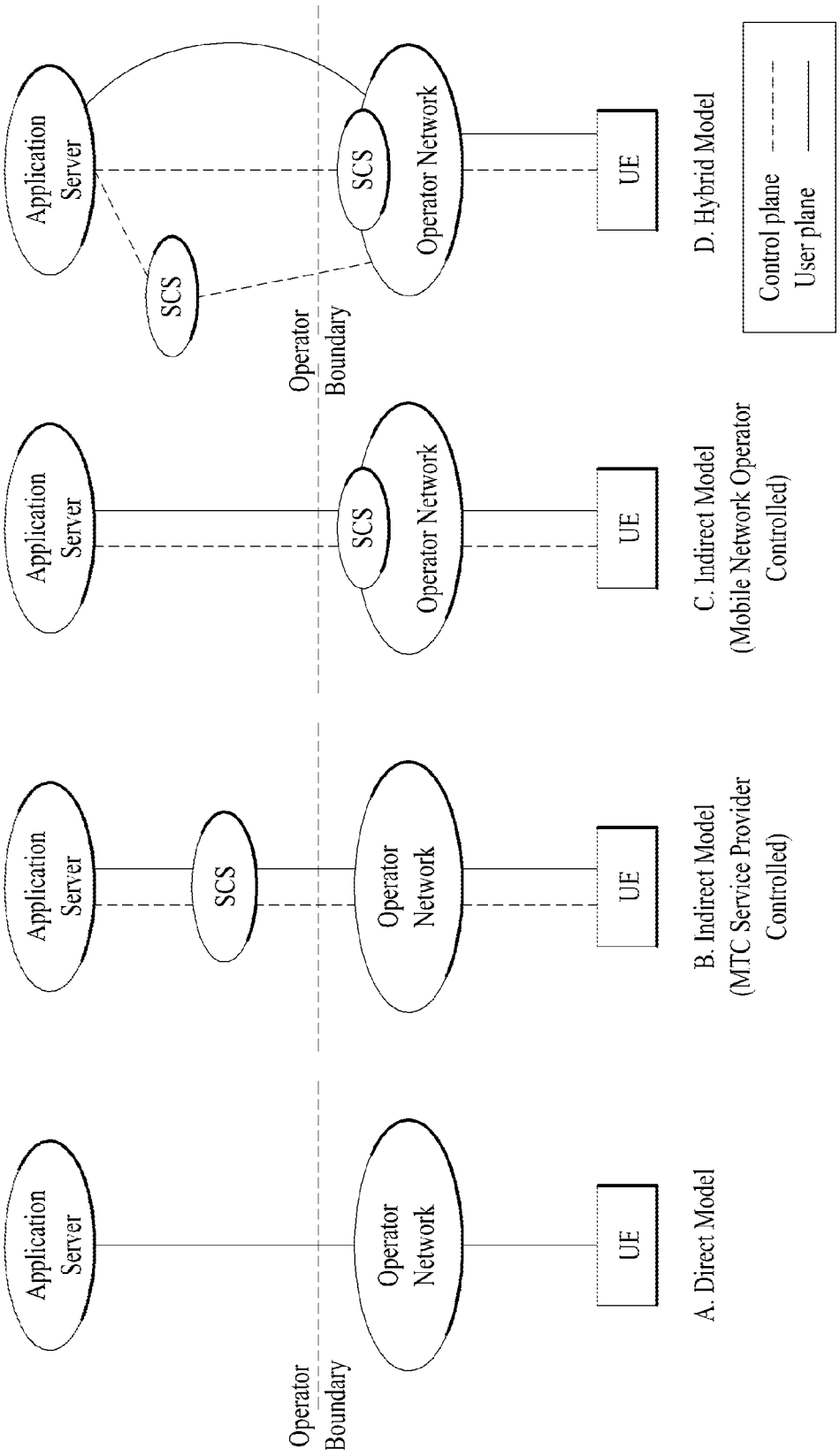
FIG. 2 is a diagram showing examples of an MTC communication model.

FIG. 2 is a diagram showing examples of an MTC communication model.

Although communication through a PS network is defined in association with MTC in 3GPP GSM/UMTS/EPS, the present invention is not limited to MTC through the PS network and is applicable to MTC through the CS network. In the current technical standard, a network structure is defined using the existing bearer of a 3GPP system. Here, a method of using a short message service (SMS) for data exchange between an MTC device and an MTC server is proposed. Since a small amount of digital data such as metering information or product information is exchanged due to the characteristics of an MTC application, an SMS is most preferably used and a conventional SMS method and an IMS based method may be supported. Methods of controlling a paging range for an MTC application with low mobility have been proposed.

The MTC application is executed in each of an MTC device and an MTC server (e.g., an SCS) to interwork through communication using a network. At this time, various models of MTC traffic may be implemented depending on what participates in communication between an MTC application and a 3GPP network. FIG. 2(a) shows a model in which communication is directly performed without an MTC server (e.g., an SCS), FIG. 2(b) shows a model in which an MTC server (e.g., an SCS) is located outside an operator domain, and FIG. 2(c) shows a model in which an MTC server (e.g., an SCS) is located inside an operator domain. In addition, FIG. 2(a) corresponds to a direct communication scheme controlled by a 3GPP operator, FIG. 2(b) corresponds to a communication scheme controlled by a service provider, and FIG. 2(c) corresponds to a communication scheme controlled by a 3GPP operator.

The direct model of FIG. 2(a) shows that an MTC application directly performs communication with a UE (or an MTC device) with respect to a 3GPP network as an over-the-top (OTT) application.

The indirect model of FIGS. 2(b) and 2(c) shows that an MTC application indirectly performs communication with a UE (or an MTC device) using a supplementary service provided by a 3GPP network. More specifically, in the example of FIG. 2(b), the MTC application may use an MTC server (e.g., an SCS) for supplementary services provided by a third-party (that is, for which 3GPP is not responsible) service provider. The MTC server (e.g., the SCS) may perform communication with a 3GPP network through various interfaces. In the example of FIG. 2(c), the MTC application may use an MTC server (e.g., an SCS) for supplementary services provided by a 3GPP operator (which corresponds to a service provider). Communication between an MTC server (e.g., an SCS) and a 3GPP network is performed within a PLMN. In FIGS. 2(b) and 2(c), an interface between an MTC server (e.g., an SCS) and an MTC application is not included in the 3GPP standard.

Since the indirect models of FIGS. 2(a) and 2(b) are complementary, a 3GPP operator may combine the indirect models for a different application. That is, as shown in FIG. 2(d), an MTC communication module may be implemented as a hybrid model in which a direct model and an indirect model are simultaneously used. In case of the hybrid model, the MTC device may perform communication with a plurality of MTC servers (e.g., SCSs) in an HPLMN and an MTC server (e.g., an SCS) controlled by a service provider and an MTC server (e.g., an SCS) controlled by a 3GPP operator may be different in terms of capabilities provided to an MTC application.

Figure 3:
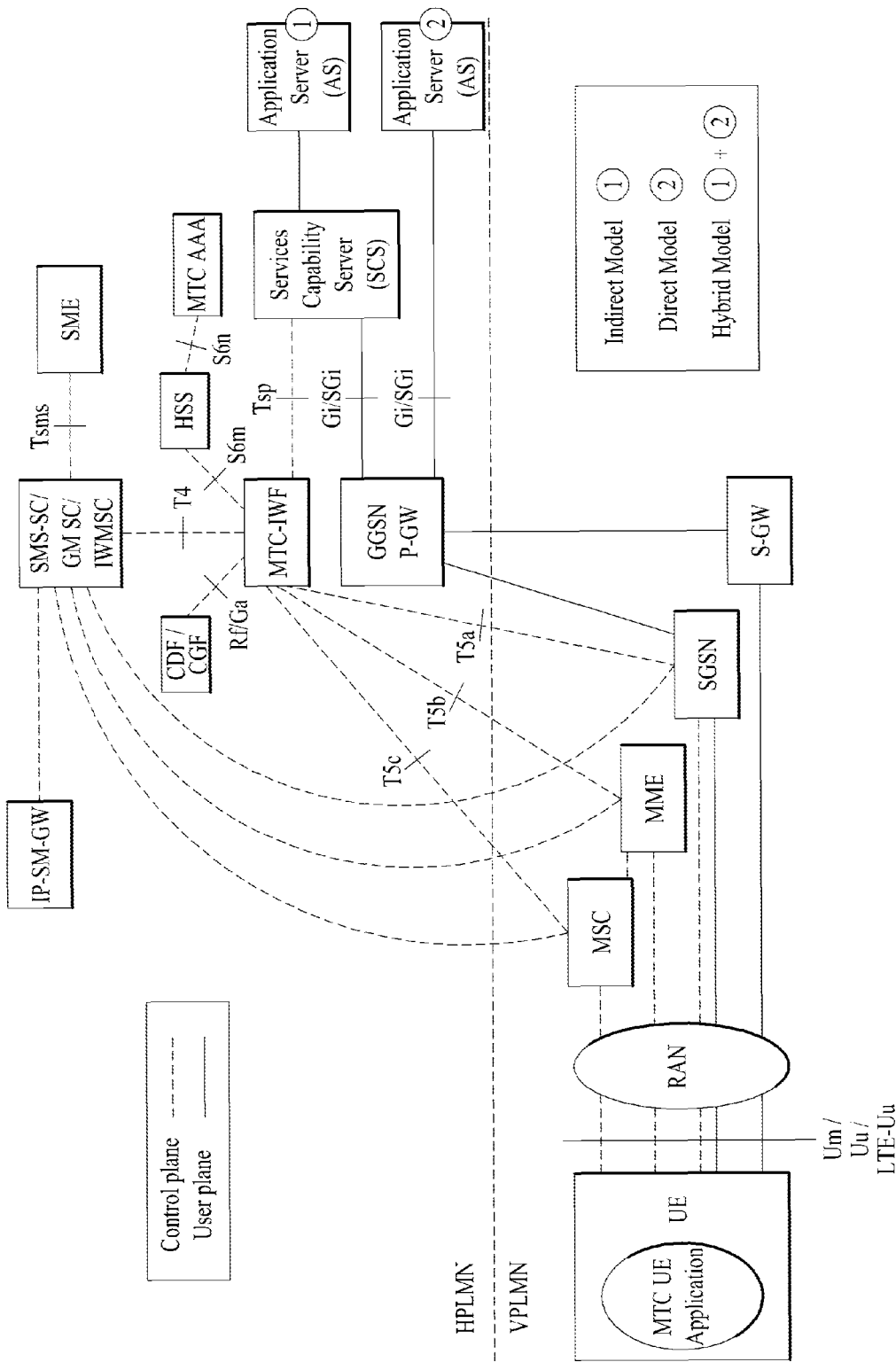
FIG. 3 is a diagram showing an exemplary model of an MTC architecture.

FIG. 3 is a diagram showing an exemplary model of an MTC architecture.

An end-to-end application between a UE (or an MTC device) used for MTC and an MTC application may use services provided by a 3GPP system and selective services provided by an MTC server (e.g., an SCS). A 3GPP system may provide transport and communication services (including a 3GPP bearer service, and IMS and an SMS) including a variety of optimization services facilitating MTC. In FIG. 3, a UE used for MTC is connected to a 3GPP network (UTRAN, E-UTRAN, GERAN, I-WLAN, etc.) through a Um/Uu/LTE-Uu interface. The architecture of FIG. 3 includes various MTC models described with reference to FIG. 2.

First, entities shown in FIG. 3 will be described.

In FIG. 3, an application server is a server on a network in which an MTC application is executed and may be referred to as an MTC application server. Technologies for implementing various MTC applications are applicable to an MTC application server and a detailed description thereof will be omitted. In addition, the MTC application server may access an MTC server (e.g., an SCS in FIG. 3) through a reference point API and a detailed description thereof will be omitted. Alternatively, the MTC application server may be co-located with an MTC server (e.g., an SCS).

AN MTC server (e.g., an SCS) is a server on a network for managing an MTC device and may be connected to a 3GPP network to communicate with nodes of a PLMN and a UE used for MTC.

An MTC-interworking function (IWF) may control interworking between an MTC server and an operator core network and serve as a proxy of MTC operation. In order to support an MTC indirect or hybrid model, one or more MTC-IWFs may be present in a home PLMN (HPLMN). The MTC-IWF may relay and interpret a signaling protocol on a reference point Tsp to enable a PLMN to perform a specific function. The MTC-IWF may perform a function for authenticating an MTC server, a function for authenticating a control plane request from an MTC server, various functions associated with the below-described trigger instructions, etc. before the MTC server establishes communication with a 3GPP network.

A short message service-service center (SMS-SC)/Internet protocol short message gateway (IP-SM-GW) may manage transmission and reception of an SMS. The SMS-SC serves to relay a short message between a short message entity (SME) (an entity for transmitting or receiving a short message) and a mobile station and storing and forwarding the short message. The IP-SM-GW may serve to perform protocol interworking between an IP based UE and an SMS-SC.

A charging data function (CDF)/charging gateway function (CGF) may perform a charging operation.

HLR/HSS serves to store and provide subscriber information (IMSI, etc.), routing information, configuration information, etc. to the MTC-IWF.

A mobile switching center (MSC)/SGSN/MME may perform a control function such as mobility management, authentication, resource allocation, etc. for network connection of a UE. In association with the below-described triggering, the MSC/SGSN/MME may serve to receive a trigger instruction from the MTC-IWF and process the trigger instruction into the form of a message provided to the MTC device.

A gateway GPRS support node (GGSN)/serving-gateway (S-GW)+packet data network-gateway (P-GW) may serve as a gateway for connecting a core network and an external network.

Table 2 shows main reference points of FIG. 3.

TABLE 2

| Reference point | Description |
| --- | --- |
| Tsms | Reference point used by an entity outside the 3GPP system to communicate with UEs used for MTC via SMS. |
| Tsp | Reference point used by an SCS to communicate with the MTC-IWF related to control plane signaling. |
| T4 | Reference point used by MTC-IWF to route device trigger to the SMS-SC in the HPLMN. |
| T5a | Reference point used between MTC-IWF and serving SGSN. |
| T5b | Reference point used between MTC-IWF and serving MME. |
| T5c | Reference point used between MTC-IWF and serving MSC. |
| S6m | Reference point used by MTC-IWF to interrrogate UE identity (HSS/HLR for E.164 mobile station international subscriber directory number (MSISDN) or external identifier mapping to IMSI) and gather UE reachability and configuration information. |
| S6n | Reference point used by MTC-AAA to interrogate HSS/HLR. |

Among T5a, T5b and T5c, one or more reference points may be referred to as T5.

In case of the indirect and hybrid model, user plane communication with an MTC server (e.g., an SCS) may be performed and, in case of the direct and hybrid model, communication with an MTC application server may be performed using a conventional protocol through Gi and SGi.

Details associated with description of FIGS. 2 to 3 may be incorporated by referring to 3GPP TS 23.682.

NAS Level Congestion Control

In general, the case in which a network exceeds a limit of a controllable communication amount may be referred to as a network congestion or overload state and operation for controlling a transmission/reception amount of a network to prevent network congestion may be referred to as network congestion control. In a 3GPP MTC network, if network congestion or overload occurs, NAS level congestion control is performed between a UE and a node (e.g., MME, SGW, PDN-GW, MSC, SGSN or GGSN) of a core network and thus signaling congestion may be avoided or controlled.

Such NAS level congestion control includes AP based congestion control and general NAS level management control.

APN based congestion control refers to signaling congestion control according to a mobility management (MM)/session management (SM) protocol associated with an APN (that is, an APN associated with a congestion state) and a UE or an EPS mobility management (EMM)/EPS session management (ESM) protocol. APN based congestion control includes APN based session management congestion control and APN based mobility management congestion control.

General NAS level mobility management control means a code network node (e.g., MME, SGW, PDN-GW, MSC, SGSN or GGSN) rejects a mobility management signaling request made by a UE in a state of network congestion or overload to avoid congestion and overload.

In general, if a core network performs NAS level congestion control, a reject message provided to a UE may include a standby time (or an extended standby time) value. Such a standby time value is randomized within a predetermined range to be provided to the UE. The UE sets the received standby time value as a back-off timer value and operates so as not to request (E)MM/(E)SM signaling from a network until the back-off timer has expired.

(E)MM signaling includes, for example, an attach request, a TAU/RAU request, a service request, an extended service request, etc. In addition, (E)SM signaling includes, for example, PDN connectivity, bearer resource allocation, bearer modification, packet data protocol (PDP) context activation, PDP context modification request, etc. The back-off timer may be divided into an MM back-off timer for control of (E)MM signaling and an SM back-off timer for control of (E)SM signaling. The MM back-off timer is assigned per UE and the SM back-off timer is assigned per associated APN or per UE. These timers may independently run.

Additionally, in a 3GPP network, a terminal (e.g., an MTC device) may be configured through a NAS configuration MO to have "NAS signaling low priority". The UE configured with the NAS signaling low priority sets low priority in a NAS message (e.g., an attach request, a TAU request, a PDN connection request, etc.) and transmits the NAS message.

In general, if a core network performs NAS level congestion control, a back-off timer (or an execution standby timer) value is included in a reject message of a terminal configured with low priority (for example, if the NAS signaling low priority indicator is set such that a UE/MS is configured for NAS signaling low priority) to be transmitted. As described above, a terminal which receives a back-off timer value runs so as not to request (E)MM/(E)SM signaling from a network until a back-off timer (e.g., an MM back-off timer and/or an SM back-off timer) has expired.

Even when the back-off timer runs, an emergency service must be provided. Accordingly, if a UE/MS has already performed or starts to perform an emergency bearer service with respect to service users having a high priority, it is possible to make a request for the service even when the MM/SM back-off timer runs. Service users having a high priority may access a network with multimedia priority service access classes 11 to 15, for example. Further, performing MT(Mobile Terminated) call/SMS services and emergency call services are cases except for applying back-off timer operations (i.e., those services may be provided even though the back-off timer is running).

Multiple Priorities

In a current 3GPP standard (Rel-10/Rel-11) MTC system environment, a UE/MS (hereinafter, referred to as a "terminal") may be configured with only one of two priorities, that is, "(NAS signaling) low priority" and "(NAS signaling) non-low priority". For example, a NAS signaling low priority indicator may be set such that a UE/MS is configured for NAS signaling low priority or a UE/MS is not configured to NAS signaling low priority.

However, a terminal may have multiple priorities of two levels or more according to future application environments. In addition, such multiple priorities may be configured per device (or per terminal) or per application level. A priority configured per UE and a priority configured per application may be separately (independently) configured. In addition, one of a plurality of priorities may be configured with respect to one application.

Since operation associated with the priority in a conventional wireless communication system is defined in consideration of only one of a "low priority" and a "non-low priority", accurate operation may not be performed if two or more priorities are configured. Accordingly, in the present invention, an operation method when multiple priorities are configured and an operation method when a priority is changed are proposed.

In order to configure different priorities per device or per application level to establish a PDN connection whenever a terminal having multiple priorities establishes a PDN connection, it is necessary to compensate for a method of establishing a PDN connection of a terminal having multiple priorities.

If a previously established PDN connection is a PDN connection having a low priority but a priority is newly changed to a different priority per device or per application level, the changed priority is applied to the newly established PDN connection. In this case, how to process a previously established PDN connection is ambiguous. For example, a PDN connection method according to priority change should be provided in order to determine whether a PDN connection having a previously configured priority is maintained or whether a PDN connection having a previously configured priority is released and a newly changed priority is applied to re-establish a PDN connection.

As described above, in a state in which an (E)MM back-off timer and an (E)SM back-off timer individually or simultaneously runs in a terminal, the terminal cannot request MM associated signaling and/or SM associated signaling from a network. However, if an emergency call/service or a multimedia priority service is used, the terminal may perform an associated procedure even when the back-off timer runs.

How a terminal having multiple priorities per terminal or per application level performs operation based on an MM back-off timer and/or an SM back-off timer (hereinafter, referred to as a "MM/SM back-off timer") if a priority is changed is ambiguous. For example, a back-off timer processing method according to priority change should be provided in order to determine whether the existing MM/SM back-off timer is stopped or maintained if a priority is changed.

For example, since how a terminal having multiple priorities processes a PDN connection according to priority change or processes a running MM/SM back-off timer according to priority change due to network congestion when the MM/SM back-off timer runs is ambiguous, PDN connection control and/or NAS level congestion control cannot be accurately or efficiently performed. In this case, network state, service connectivity and user experience are further deteriorated. Accordingly, if multiple priorities of two levels or more are applied and/or a priority is changed, there is a need for a new method of processing a PDN connection and an MM/SM back-off timer.

NAS Level Operation Improved by Applying Multiple Priorities

As described above, it is assumed that MTC involves communication between a large number of terminals and a network and the amount of data of each terminal is relatively small and is not emergency (e.g., report of a metering result, etc.). Accordingly, an MTC device is generally configured with low priority.

In such an MTC system environment, a priority is changed (for example, from a low priority to a non-low priority) per terminal or per application level when emergency data needs to be transmitted or if a priority level is explicitly or implicitly requested to be changed when an MTC terminal is triggered (that is, operation for enabling an MTC device to establish an IP connection by predetermined request or indication signaling) by an MTC server, etc. Although it is assumed that the priority level is changed from a relatively low priority level to a relatively high priority level in the above examples, the present invention is not limited thereto and the principle of the present invention is equally applicable to the case in which the priority level is changed from a relatively high priority level to a relatively low priority level.

In association with application of multiple priorities, the number of priority levels may be changed according to application and service environment. For example, one of two priority levels (that is, a low priority and a normal (or non-low) priority) may be configured. Alternatively, one of three priority levels (that is, a low priority, a normal priority and a high priority) may be configured. Three priority levels may be configured as priority level-1, level-2 and level-3 (a high level means a higher priority and level-1 means lowest priority). Four or more priority levels may be configured. A high priority may have a meaning different from that of a multimedia priority service (that is, high priority access).

According to the present invention, in case of priorities of two levels (or dual priorities), an MM/SM back-off timer is applicable to only the case in which a terminal is configured with low priority. In case of priorities of 3 levels or more, an MM/SM back-off timer is applicable to only the case in which a terminal is configured with lowest priority. Alternatively, in case of priorities of 3 levels or more, an MM/SM back-off timer is applicable to a predetermined priority level (e.g., one or more priority levels ranked in ascending order). Here, in multiple priorities of two levels and/or multiple priorities of three levels, a determination as to at which priority level the MM/SM back-off timer is applied may be made based on at least one of network state, policy, preference and configuration.

If a terminal having multiple priorities is configured with a different priority according to application level, one or more applications may establish different PDN connections (that is, one PDN connection is established with respect to one application) or one or more applications may share one PDN connection. If one or more applications establish different PDN connections, an SM back-off timer is applicable to the PDN connections per APN. If one or more applications share one PDN connection, a plurality of applications configures different bearers (a default EPS bearer or dedicated EPS bearer(s)). In this case, an SM back-off timer is applicable per bearer ID.

If a terminal is configured with multiple priorities of two levels or more, priority change/configuration may be performed as necessary (e.g., a request of an application, another request of a terminal (e.g., configuration of a user) or a request of a network) after configuration for application of multiple priorities. Configuration for application of multiple priorities does not mean that which of multiple priority levels is configured but means that any one of multiple priorities is configured. That is, one priority level of multiple priorities may be provided to a terminal, for which application of multiple priorities is configured, by priority change/configuration, if necessary. Here, "configuration for application of multiple priorities" may be referred to as "multiple priority integration configuration".

Hereinafter, the principle of the present invention for control of a PDN connection and an MM/SM back-off timer(s) in case of multiple priorities will be described.

First, if a priority is changed/configured per terminal (that is, if one terminal has one priority at a certain time (one of a low priority or a normal priority in case of priorities of two levels or one of level-1, level-2, level-3, . . . in case of priorities of three levels or more), the following one or more methods are applicable to PDN connection establishment.

As a first method, a PDN connection which has been established before a priority of a certain terminal is changed may be maintained and a new PDN connection may be established. Here, establishing a new PDN connection while maintaining a previously established PDN connection may mean that the PDN connection having the same APN as the previously established PDN connection is newly established or that the PDN connection having an APN different from that of the previously established PDN is newly established. At this time, the previously established PDN connection may maintain the priority set before change and the new PDN connection may use the changed priority.

As a second method, a PDN connection established before the priority of a certain terminal is changed may be released/deactivated and a new PDN connection may be reestablished. Releasing/deactivating the previously established PDN connection and reestablishing the new PDN connection means that a PDN connection having the same APN as the existing APN is newly established. In this case, when a new PDN connection is established, a PDN connection set to the changed priority may be generated.

In addition, if a priority is changed/set per terminal, the following one or more methods may be applied to operation associated with MM/SM back-off timer(s).

As a first method, if a low priority is changed to a normal priority while MM/SM back-off timer(s) runs in case of multiple priorities of two levels or if the priority is changed to a priority level except for a predetermined priority level (e.g., level-1 or several levels ranked in ascending order) in case of multiple priorities of three levels or more, the MM/SM back-off timer(s) may be stopped.

As the second method, even when the priority is changed, the running MM/SM back-off timer(s) may not be stopped.

Next, if the priority is changed/set per application level (that is, each of one or more application associated with one terminal has one priority (one of a low priority or a normal priority in case of priorities of two levels or one of priority level-1, level-2, level-3, . . . in case of priorities of three levels or more), the following operation may be performed. In PDN connection control, a PDN connection which was previously established before the priority of a certain application is changed may be maintained and a new PDN connection may be established. At this time, the priority of the previously established PDN connection may be maintained as the priority set before change and the changed priority may be assigned to the new PDN connection. In addition, established PDN connection(s) may be released/deactivated, and a new PDN connection may be re-established. Here, releasing/deactivating the established PDN connection(s) and re-establishing a new PDN connection may imply that newly establish a PDN connection having APN which is the same as the former APN. In this case, when establishing a new PDN connection, a PDN connection set as a changed priority may be created. Next, in control of the MM/SM back-off timer(s), if a low priority is changed to a normal priority while MM/SM back-off timer(s) runs in case of multiple priorities of two levels or if the priority is changed to a priority level except for a predetermined priority level (e.g., level-1 or several levels ranked in ascending order) in case of multiple priorities of three levels or more, the MM/SM back-off timer(s) may be stopped. In addition, MM/SM back-off timer(s) may not stop even though the priority is changed.

In the above-described examples (that is, in the case in which the priority is changed per terminal or per application level), even when the priority level is changed, the MM/SM back-off timer is not stopped and the terminal may make an MM signaling request (e.g., a service request of a normal priority or a higher priority level, an attach request or a TAU/RAU request). In the related art, a NAS message is prevented from being transmitted when the back-off timer runs and may be transmitted only when the back-off timer has expired or stopped. However, according to the present invention, if the priority is changed while the back-off timer runs, the NAS message may be transmitted without stopping the back-off timer.

Hereinafter, proposals according to the principle of the present invention will be described. In the following description, Proposals 1a to 1c relate to the above-described examples of the principle of the present invention, proposals 2a to 2j relate to multiple priorities of two levels, i.e., dual priorities (e.g., a low priority or a non-low (normal) priority), and Proposals 3a to 3j relate to multiple priorities of three level or more (e.g., a low priority, a middle priority, a high priority, . . . , or priority level-1, level 2, level-3, . . . ).

Proposal 1a

In the present invention, the priority level of a terminal may be configured per terminal or per application level.

A network (e.g., an MME or an SGSN) may transmit a "NAS configuration MO" including parameters associated with NAS functionality to the terminal and manage the NAS function of the terminal. Provision of the NAS configuration MO may be performed through an OMA DM and is described in detail in 3GPP TS 24.368.

In the present invention, device property information is further included in the NAS configuration MO and is sent from the network to the terminal. The device property information may indicate one of priorities of two levels (e.g., a low priority or a normal priority) or priorities of three levels or more (e.g., priority level-1, level-2, level-3, . . . ).

Accordingly, according to such device property information, the terminal may be configured with a predetermined priority level.

In addition, in the present invention, if the priority is configured per application level, the priority may be configured by an OS (e.g., Android, iOS, Windows OS, Linux, etc.) platform of the terminal or a new configuration function may be necessary.

In particular, according to the present invention, if the terminal wishes to transmit emergency data (e.g., data transmitted when the priority exceeds a predetermined threshold), the previously configured priority may be changed to a higher priority level (e.g., a low priority is changed to a normal priority or a relatively low priority level is changed to a relatively high priority level) to transmit data. Priority level change may be performed by the OS platform of the terminal or through a new configuration function.

If the priority is configured per application level, the priority level may be configured per application through the OS platform. An interface with the OS platform for configuring the priority and a function thereof are not described in detail in the present invention and may use the well-known method of the field of the present invention.

In addition, the priority may be configured or changed through a UE (device) triggering method in an MTC system environment. For example, the priority may be configured/changed by including information transparent to a 3GPP network entity or information, which is not transparent to a 3GPP network entity, in a triggering message.

In configuration of the priority level of the terminal, the priority level may be changed by an application or according to circumstances after configuration of application of multiple priorities to the terminal (or multiple priority integration configuration). Application of multiple priorities (or multiple priority integration configuration) does not indicate which of the multiple priority levels is configured and means that any one of the multiple priorities is configured. In addition, application of multiple priorities (or multiple priority integration configuration) may be configured according to a MO of an OMA DM, a request of an application, a configuration of a manufacturer, or another configuration method.

Proposal 1b

In the present invention, an MM/SM back-off timer may be applied to a lowest priority or one or more priority levels ranked in ascending order among multiple priority levels. A determination as to at which priority level the MM/SM back-off timer is applied may be made based on at least one of network state, policy, preference and configuration.

Here, a determination as to whether the MM/SM back-off timer is applied at only a predetermined priority level and/or a determination as to which priority level is set as the predetermined priority level may be statically made according to application or may be dynamically made based on subscriber data, operator policy or preference.

For example, while the terminal performs a TAU/RAU process, a network node (e.g., an MME/SGSN or a PDN GW) may acquire the subscriber data and/or operator policy/preference. For example, the PDN GW may acquire operator policy/preference information by interworking between the PDN GW and the PCRF. At this time, information indicating whether the MM/SM back-off timer is applied according to the priority level may be determined or acquired. In addition, an MME/SGSN (that is, a new MME/SGSN) associated with a new TA/RA may receive location update ACK including subscriber information from an HSS. At this time, information indicating whether the MM/SM back-off timer is applied according to the priority level may be determined or acquired.

As another example, while the terminal performs an attach process, the network node (e.g., an MME, SGSN or a PDN GW) may acquire the subscriber data and/or operator policy/preference. For example, an MME/SGSN to which the terminal transmits an attach request message may receive location update ACK including subscriber information from a HSS. At this time, information indicating whether the MM/SM back-off timer is applied according to the priority level may be determined or acquired. The PDN GW may acquire operator policy/preference information by interworking between the PDN GW and the PCRF. At this time, information indicating whether the MM/SM back-off timer is applied according to the priority level may be determined or acquired.

For detailed operation of a TAU/RAU process and an attach process, refer to 3GPP TS 23.401.

Proposal 1c

In the present invention, the priority level may be differently applied according to application level. In general, a plurality of applications having different priority levels may establish/use different PDN connections or a plurality of applications having different priority levels may share and establish/use one PDN connection.

For example, if n (n≥2) applications share one PDN connection, one application maintains a low priority level and, if the remaining n−1 applications change the low priority to a normal (or relatively high) priority level to transmit data, the existing PDN connection established for one application of the low priority may be maintained. As another example, if n applications share one PDN connection, only one application changes a low priority to a normal (or relatively high) priority level to transmit data and, if the remaining n−1 applications maintain a low priority level, the existing PDN connection may be maintained. That is, the existing PDN connection established for the applications of the low priority level should be maintained if only one application of the low priority level remains.

Alternatively, the PDN connection established before the priority is changed may be released and a new PDN connection set to the changed priority may be re-established.

In addition, by combining the above-described two methods, a hybrid method of establishing different PDN connections by several applications having different priority levels and establishing one PDN connection by several other applications is applicable.

Proposal 1d

In the present invention, if a plurality of applications shares one PDN connection in a terminal having multiple priorities, the method of applying the PDN connection and the MM/SM back-off timer will now be described.

First, a configuration of multiple priorities associated with PDN connection establishment and bearer activation/deactivation will be described.

For example, the priority may not be configured per PDN connection (that is, APN) but the priority level may be configured according to a plurality of bearers within one PDN connection. The priorities may be configured per bearer ID (e.g., a default EPS bearer/dedicated EPS bearer), not per APN.

If the priority level is changed per bearer, the previously established bearer may be maintained with the previously configured priority or the existing bearer may be deactivated and the bearer configured with the changed priority level may be re-activated. Simultaneously or separately, the previously established PDN connection may be maintained with the previously configured priority level or the existing PDN connection may be released and the PDN connection set to the changed priority may be reestablished.

Next, according to the present invention, the MM back-off timer may be applied per terminal or per application level.

While the SM back-off timer is configured per APN in the related art, the SM back-off timer is not configured per APN (that is, per PDN connection) but is configured per bearer (that is, on a per bearer ID basis) in the present invention.

In the following description, all methods of configuring/identifying the priority per bearer are applicable to Proposals 2a to 3j.

Proposal 2a

If the terminal is configured with multiple priorities (or dual priorities) of two levels (that is, the terminal is configured with any one of priorities of two levels (a low priority or a normal priority)) and the priority level is changed/set per terminal (that is, if the terminal has any one of two priority levels at a certain time), the following operation may be performed.

The PDN connection established before the priority is changed may be maintained (at this time, the priority set before change is maintained) and a new PDN connection set to the changed priority may be established.

Next, if the MM back-off timer runs and the low priority is changed to the normal priority, the MM back-off timer may be stopped.

Next, even when the SM back-off timer(s) runs, the timer may not be stopped. If the SM back-off timer(s) is not stopped, even when the SM back-off timer for a specific APN runs, the terminal may make an SM signaling request (e.g., a PN connection request, a bearer resource modification request, a bearer resource allocation request, etc.) having a normal (that is, non-low) priority for the same APN with respect to the network.

Proposal 2b

If the terminal is configured with multiple priorities of two levels and the priority level is changed/set per terminal, the following operation may be performed.

The PDN connection established before the priority is changed may be maintained (at this time, the priority configured before change is maintained) and a new PDN connection set to the changed priority may be established.

Next, even when the MM back-off timer runs, the timer may not be stopped. If the MM back-off timer is not stopped, the terminal may make an MM signaling request (e.g., an attach request, a TAU/RAU request or a service request), which does not indicate a low priority (or is configured with a non-low/normal/high priority), with respect to the network.

Next, even when the SM back-off timer(s) runs, the timer may not be stopped. If the SM back-off timer(s) is not stopped, even when the SM back-off timer for a specific APN runs, the terminal may make an SM signaling request (e.g., a PN connection request, a bearer resource modification request, a bearer resource allocation request, etc.) having a normal (that is, non-low) priority for the same APN with respect to the network.

Proposal 2c

If the terminal is configured with multiple priorities of two levels and the priority level is changed/set per terminal, the following operation may be performed.

The PDN connection established before the priority is changed may be released and a PDN connection set to the changed priority may be re-established.

Next, if the MM back-off timer runs and the low priority is changed to the normal priority, the MM back-off timer may be stopped.

Next, if the SM back-off timer(s) runs and the low priority is changed to the normal priority, the SM back-off timer(s) may be stopped.

Proposal 2d

If the terminal is configured with multiple priorities of two levels and the priority level is changed/set per terminal, the following operation may be performed.

The PDN connection established before the priority is changed may be released and a PDN connection set to the changed priority may be re-established.

Next, even when the MM back-off timer runs, the timer may not be stopped. If the MM back-off timer is not stopped, the terminal may make an MM signaling request (e.g., an attach request, a TAU/RAU request or a service request), which does not indicate a low priority (or is configured with a non-low/normal/high priority), with respect to the network.

Next, if the SM back-off timer(s) runs and the low priority is changed to the normal priority, the SM back-off timer(s) may be stopped.

Proposal 2e

If the terminal is configured with multiple priorities of two levels and the priority level is changed/set per terminal, the following operation may be performed.

The PDN connection established before the priority is changed may be released and a PDN connection set to the changed priority may be re-established.

Next, even when the MM back-off timer runs, the timer may not be stopped. If the MM back-off timer is not stopped, the terminal may make an MM signaling request (e.g., an attach request, a TAU/RAU request or a service request), which does not indicate a low priority (or is configured with a non-low/normal/high priority), with respect to the network.

Next, even when the SM back-off timer(s) runs, the timer may not be stopped. If the SM back-off timer(s) is not stopped, even when the SM back-off timer for a specific APN runs, the terminal may make an SM signaling request (e.g., a PN connection request, a bearer resource modification request, a bearer resource allocation request, etc.) having a normal (that is, non-low) priority for the same APN with respect to the network.

Proposal 2f

If the terminal is configured with multiple priorities (or dual priorities) of two levels (that is, the terminal is configured with any one of priorities of two levels (a low priority or a normal priority)) and the priority level is changed/set per application (that is, if any one of a low priority or a normal priority is set per application and the terminal has a priority which is changed according to application), the following operation may be performed.

The PDN connection established before the priority is changed may be maintained (at this time, the priority set before change is maintained) and a new PDN connection set to the changed priority may be established.

Next, if the MM back-off timer runs and the low priority is changed to the normal priority, the MM back-off timer may be stopped.

Next, even when the SM back-off timer(s) runs, the timer may not be stopped. If the SM back-off timer(s) is not stopped, even when the SM back-off timer for a specific APN runs, the terminal may make an SM signaling request (e.g., a PN connection request, a bearer resource modification request, a bearer resource allocation request, etc.) having a normal (that is, non-low) priority for the same APN with respect to the network.

Proposal 2g

If the terminal is configured with multiple priorities of two levels and the priority level is changed/set per application level, the following operation may be performed.

The PDN connection established before the priority is changed may be maintained (at this time, the priority set before change is maintained) and a new PDN connection set to the changed priority may be established.

Next, even when the MM back-off timer runs, the timer may not be stopped. If the MM back-off timer is not stopped, the terminal may make an MM signaling request (e.g., an attach request, a TAU/RAU request or a service request), which does not indicate a low priority (or is configured with a non-low/normal/high priority), with respect to the network.

Next, even when the SM back-off timer(s) runs, the timer may not be stopped. If the SM back-off timer(s) is not stopped, even when the SM back-off timer for a specific APN runs, the terminal may make an SM signaling request (e.g., a PN connection request, a bearer resource modification request, a bearer resource allocation request, etc.) having a normal (that is, non-low) priority for the same APN with respect to the network.

Proposal 2h

If the terminal is configured with multiple priorities of two levels and the priority level is changed/set per application level, the following operation may be performed.

The PDN connection established before the priority is changed may be released and a PDN connection set to the changed priority may be re-established.

Next, if the MM back-off timer runs and the low priority is changed to the normal priority, the MM back-off timer may be stopped.

Next, if the SM back-off timer(s) runs and the low priority is changed to the normal priority, the SM back-off timer(s) may be stopped.

Proposal 2i

If the terminal is configured with multiple priorities of two levels and the priority level is changed/set per application level, the following operation may be performed.

The PDN connection established before the priority is changed may be released and a PDN connection set to the changed priority may be re-established.

Next, even when the MM back-off timer runs, the timer may not be stopped. If the MM back-off timer is not stopped, the terminal may make an MM signaling request (e.g., an attach request, a TAU/RAU request or a service request), which does not indicate a low priority (or is configured with a non-low/normal/high priority), with respect to the network.

Next, if the SM back-off timer(s) runs and the low priority is changed to the normal priority, the SM back-off timer(s) may be stopped.

Proposal 2j

If the terminal is configured with multiple priorities of two levels and the priority level is changed/set per application level, the following operation may be performed.

The PDN connection established before the priority is changed may be released and a PDN connection set to the changed priority may be re-established.

Next, even when the MM back-off timer runs, the timer may not be stopped. If the MM back-off timer is not stopped, the terminal may make an MM signaling request (e.g., an attach request, a TAU/RAU request or a service request), which does not indicate a low priority (or is configured with a non-low/normal/high priority), with respect to the network.

Next, even when the SM back-off timer(s) runs, the timer may not be stopped. If the SM back-off timer(s) is not stopped, even when the SM back-off timer for a specific APN runs, the terminal may make an SM signaling request (e.g., a PN connection request, a bearer resource modification request, a bearer resource allocation request, etc.) having a normal (that is, non-low) priority for the same APN with respect to the network.

Proposal 3a

If the terminal is configured with multiple priorities of three levels or more (that is, the terminal is configured with any one of priorities of three levels or more (a low priority, a normal/middle priority, a high priority, . . . , or priority level-1, level-2, level-3, . . . )) and the priority level is changed/set per terminal (that is, if the terminal has any one of priority level-1, level-2, level-3, . . . at a certain time), the following operation may be performed.

The PDN connection established before the priority is changed may be maintained (at this time, the priority set before change is maintained) and a new PDN connection set to the changed priority may be established.

Next, if the MM back-off timer runs and the priority level is changed, the MM back-off timer may be stopped according to the changed priority level. A determination as to whether the MM back-off timer is applied/stopped according to the priority level may be statically made according to application or may be dynamically made based on subscriber data, operator policy or preference.

Next, even when the SM back-off timer(s) runs, the timer may not be stopped. If the SM back-off timer(s) is not stopped, even when the SM back-off timer for a specific APN runs, the terminal may make an SM signaling request (e.g., a PN connection request, a bearer resource modification request, a bearer resource allocation request, etc.) having a normal (that is, non-low) priority for the same APN with respect to the network.

Proposal 3b

If the terminal is configured with multiple priorities of three levels or more and the priority level is changed/set per terminal, the following operation may be performed.

The PDN connection established before the priority is changed may be maintained (at this time, the priority set before change is maintained) and a new PDN connection set to the changed priority may be established.

Next, even when the MM back-off timer runs, the timer may not be stopped. If the MM back-off timer is not stopped, the terminal may make an MM signaling request (e.g., an attach request, a TAU/RAU request or a service request), which does not indicate a low priority (or is configured with a non-low/normal/high priority), with respect to the network.

Next, even when the SM back-off timer(s) runs, the timer may not be stopped. If the SM back-off timer(s) is not stopped, even when the SM back-off timer for a specific APN runs, the terminal may make an SM signaling request (e.g., a PN connection request, a bearer resource modification request, a bearer resource allocation request, etc.) having a normal (that is, non-low) priority for the same APN with respect to the network.

Proposal 3c

If the terminal is configured with multiple priorities of three levels or more and the priority level is changed/set per terminal, the following operation may be performed.

The PDN connection established before the priority is changed may be released and a PDN connection set to the changed priority may be re-established.

Next, if the MM back-off timer runs and the priority level is changed, the MM back-off timer may be stopped according to the changed priority level.

Next, if the SM back-off timer runs and the priority level is changed to the normal priority, the SM back-off timer may be stopped according to the changed priority level.

A determination as to whether the MM/SM back-off timer is applied/stopped according to the priority level may be statically made according to application or may be dynamically made based on subscriber data, operator policy or preference.

Proposal 3d

If the terminal is configured with multiple priorities of three levels or more and the priority level is changed/set per terminal, the following operation may be performed.

The PDN connection established before the priority is changed may be released and a PDN connection set to the changed priority may be re-established.

Next, even when the MM back-off timer runs, the timer may not be stopped. If the MM back-off timer is not stopped, the terminal may make an MM signaling request (e.g., an attach request, a TAU/RAU request or a service request), which does not indicate a low priority (or is configured with a non-low/normal/high priority), with respect to the network.

Next, even when the SM back-off timer runs and the priority level is changed, the SM back-off timer may be stopped according to the changed priority level. A determination as to whether the SM back-off timer is applied/stopped according to the priority level may be statically made according to application or may be dynamically made based on subscriber data, operator policy or preference.

Proposal 3d

If the terminal is configured with multiple priorities of three levels or more and the priority level is changed/set per terminal, the following operation may be performed.

The PDN connection established before the priority is changed may be released and a PDN connection set to the changed priority may be re-established.

Next, even when the MM back-off timer runs, the timer may not be stopped. If the MM back-off timer is not stopped, the terminal may make an MM signaling request (e.g., an attach request, a TAU/RAU request or a service request), which does not indicate a low priority (or is configured with a non-low/normal/high priority), with respect to the network.

Next, even when the SM back-off timer(s) runs, the timer may not be stopped. If the SM back-off timer(s) is not stopped, even when the SM back-off timer for a specific APN runs, the terminal may make an SM signaling request (e.g., a PN connection request, a bearer resource modification request, a bearer resource allocation request, etc.) having a normal (that is, non-low) priority for the same APN with respect to the network.

Proposal 3f

If the terminal is configured with multiple priorities of three levels or more (that is, the terminal is configured with any one of priorities of three levels or more (a low priority, a normal/middle priority, a high priority, . . . , or priority level-1, level-2, level-3, . . . )) and the priority level is changed/set per application (that is, if any one of priority level-1, level-2, level-3, . . . may be set per application and the terminal has a priority changed according to applications), the following operation may be performed.

The PDN connection established before the priority is changed may be maintained (at this time, the priority dry before change is maintained) and a new PDN connection set to the changed priority may be established.

Next, if the MM back-off timer runs and the priority level is changed, the MM back-off timer may be stopped according to the changed priority level. A determination as to whether the MM back-off timer is applied/stopped according to the priority level may be statically made according to application or may be dynamically made based on subscriber data, operator policy or preference.

Next, even when the SM back-off timer(s) runs, the timer may not be stopped. If the SM back-off timer(s) is not stopped, even when the SM back-off timer for a specific APN runs, the terminal may make an SM signaling request (e.g., a PN connection request, a bearer resource modification request, a bearer resource allocation request, etc.) having a normal (that is, non-low) priority for the same APN with respect to the network.

Proposal 3g

If the terminal is configured with multiple priorities of three levels or more and the priority level is changed/set per application level, the following operation may be performed.

The PDN connection established before the priority is changed may be maintained (at this time, the priority set before change is maintained) and a new PDN connection set to the changed priority may be established.

Next, even when the MM back-off timer runs, the timer may not be stopped. If the MM back-off timer is not stopped, the terminal may make an MM signaling request (e.g., an attach request, a TAU/RAU request or a service request), which does not indicate a low priority (or is configured with a non-low/normal/high priority), with respect to the network.

Next, even when the SM back-off timer(s) runs, the timer may not be stopped. If the SM back-off timer(s) is not stopped, even when the SM back-off timer for a specific APN runs, the terminal may make an SM signaling request (e.g., a PN connection request, a bearer resource modification request, a bearer resource allocation request, etc.) having a normal (that is, non-low) priority for the same APN with respect to the network.

Proposal 3h

If the terminal is configured with multiple priorities of three levels or more and the priority level is changed/set per application level, the following operation may be performed.

The PDN connection established before the priority is changed may be released and a PDN connection set to the changed priority may be re-established.

Next, if the MM back-off timer runs and the priority level is changed, the MM back-off timer may be stopped according to the changed priority level.

Next, if the SM back-off timer runs and the priority level is changed, the SM back-off timer may be stopped according to the changed priority level.

A determination as to whether the MM/SM back-off timer is applied/stopped according to the priority level may be statically made according to application or may be dynamically made based on subscriber data, operator policy or preference.

Proposal 3i

If the terminal is configured with multiple priorities of three levels or more and the priority level is changed/set per application level, the following operation may be performed.

The PDN connection established before the priority is changed may be released and a PDN connection set to the changed priority may be re-established.

Next, even when the MM back-off timer runs, the timer may not be stopped. If the MM back-off timer is not stopped, the terminal may make an MM signaling request (e.g., an attach request, a TAU/RAU request or a service request), which does not indicate a low priority (or is configured with a non-low/normal/high priority), with respect to the network.

Next, even when the SM back-off timer(s) runs and the priority level is changed, the SM back-off timer may be stopped according to the changed priority level. A determination as to whether the SM back-off timer is applied/stopped according to the priority level may be statically made according to application or may be dynamically made based on subscriber data, operator policy or preference.

Proposal 3j

If the terminal is configured with multiple priorities of three levels or more and the priority level is changed/set per application level, the following operation may be performed.

The PDN connection established before the priority is changed may be released and a PDN connection set to the changed priority may be re-established.

Next, even when the MM back-off timer runs, the timer may not be stopped. If the MM back-off timer is not stopped, the terminal may make an MM signaling request (e.g., an attach request, a TAU/RAU request or a service request), which does not indicate a low priority (or is configured with a non-low/normal/high priority), with respect to the network.

Next, even when the SM back-off timer(s) runs, the timer may not be stopped. If the SM back-off timer(s) is not stopped, even when the SM back-off timer for a specific APN runs, the terminal may make an SM signaling request (e.g., a PN connection request, a bearer resource modification request, a bearer resource allocation request, etc.) having a normal (that is, non-low) priority for the same APN with respect to the network.

The above-described proposals of the present invention may be combined according to the principle of the present invention. Hereinafter, embodiments to which the principle and proposals of the present invention are applicable will be described.

Embodiment 1

Embodiment 1 relates to a method of maintaining a previously established PDN connection with a previously configured priority level and establishing a new PDN connection with a newly configured priority level if the priority level of a terminal configured with multiple priorities is changed.

In this case, if the priority level is changed, an MM back-off timer may be stopped but SM back-off timer(s) may not be stopped.

Figure 4:
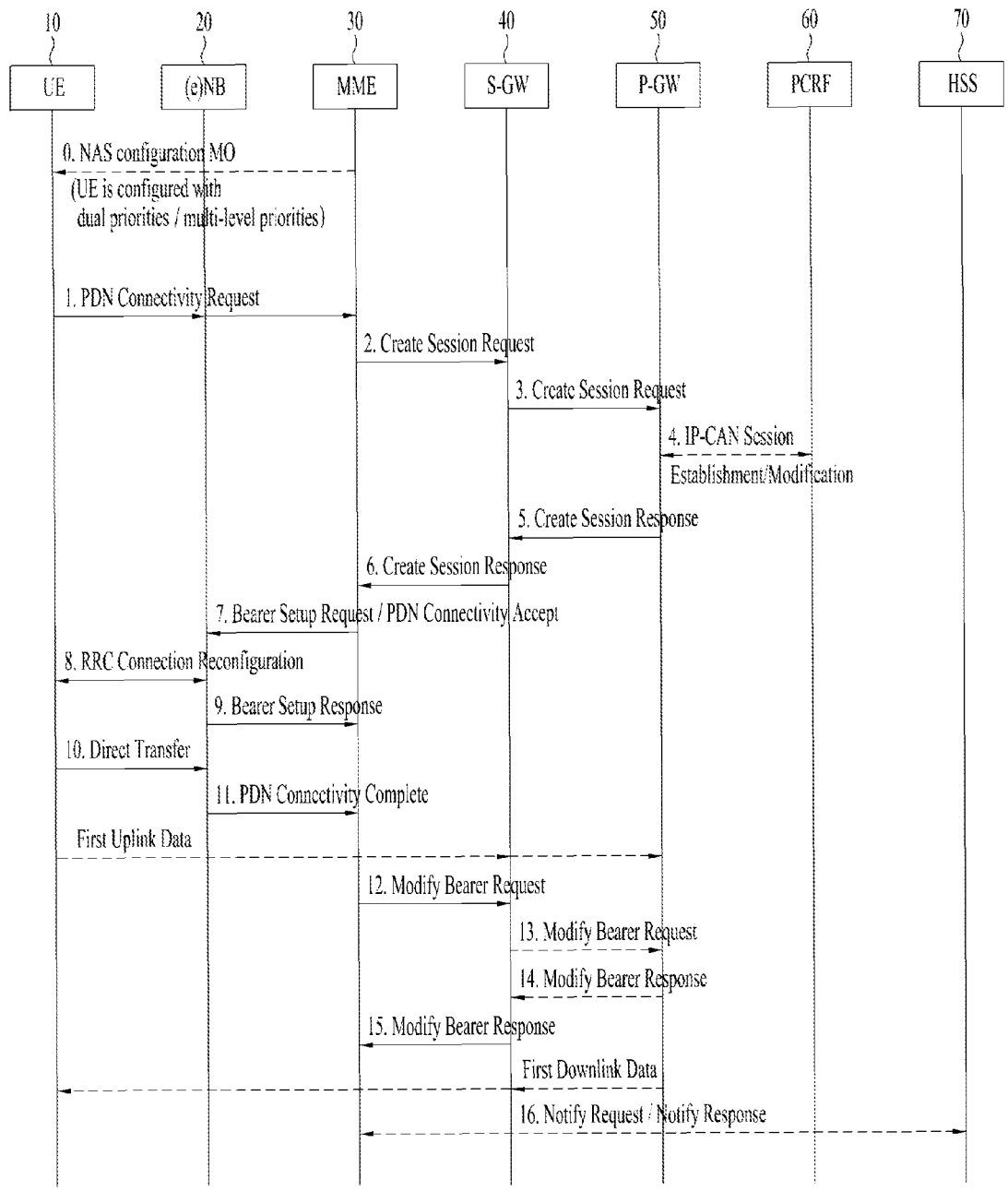
FIG. 4 is a diagram illustrating a PDN connection process according to an example of the present invention.

FIG. 4 is a diagram illustrating a PDN connection process according to an example of the present invention.

In step 0 of FIG. 4, a network (e.g., an MME 30) may transmit, to the UE 10, a NAS configuration MO including dual priority or multiple priority configuration information of a UE 10 through an OMA DM. Thus, the UE 10 may be configured with dual priorities or multiple priorities. That is, the UE 10 may have any one of the dual priorities or any one of the multiple priorities.

If the priority of the UE 10 is changed from a relatively low priority level to a relatively high priority level and a running MM back-off timer is present, the MM back-off timer may be stopped.

Even when running SM back-off timer(s) is present, the UE may not stop the SM back-off timer(s) regardless of priority change. For example, even when the SM back-off timer for a specific APN runs, an SM signaling request (e.g., a PDN connection request, a bearer resource modification request, a bearer resource allocation request, etc.) having a normal (that is, non-low) priority for the same APN may be transmitted.

In addition, the UE 10 may establish a new PDN connection configured with the changed priority while maintaining the PDN connection established before changing the priority with the priority configured before change.

More specifically, in step 1 of FIG. 4, while the previously established PDN connection is maintained, the UE 10 may send a PDN connection request message to the MME 30 through an (e)NB 20. At this time, the PDN connection request message may include APN information of a new PDN connection desired by the UE 10.

For example, the UE 10 may transmit the PDN connection request for a new PDN connection (a PDN connection having the changed priority level) having the same APN information and PDN type as the previously established PDN connection (the PDN connection having the priority before change).

Alternatively, the UE may transmit the PDN connection request for a new PDN connection (a PDN connection having the changed priority level) having APN information different from that of the previously established PDN connection (the PDN connection having the priority before change).

In steps 2 to 6 of FIG. 4 (step 4 is separately described), the MME 30 may evaluate whether the PDN connection request having a new priority for the UE 10 is allowed. The evaluation of the MME 30 may be performed based on a priority level, subscriber information, user configuration information, operator policy/preference, etc. configured with respect to the UE 10. If it is evaluated that the PDN connection for the UE 10 is allowed, the MME 30 may send a "create session request" message to an S-GW 40 for bearer creation. The S-GW 40 may send the "create session request" message to a P-GW. In response thereto, the P-GW 50 may send a "create session response" message to the S-GW 40 and the S-GW 40 may send the "create session response" to the MME 30.

Step 4 of FIG. 4 is optional and PCRF interworking for operator policy may be performed between the PCEF of the P-GW 50 and the PCRF 60 if necessary. For example, establishment and/or modification of an IP-CAN session which is an access network for providing IP connectivity may be performed.

In step 7 of FIG. 4, a PDN connection accept message may be forwarded from the MME 30 to the (e)NB 20. This message requests bearer setup to start radio resource setup of an RAN interval (between the UE 10 and the (e)NB 20).

In step 8 of FIG. 4, RRC connection reconfiguration is performed, radio resources of the RAN interval are set, and the setup result (e.g., RRC connection reconfiguration complete message) may be sent to the (e)NB 20.

In step 9 of FIG. 4, the radio bearer setup result (e.g., a radio bearer setup response) may be transmitted from the (e)NB 20 to the MME 30.

In steps 10 to 11 of FIG. 4, a PDN connectivity complete message may be sent from the UE 10 to the MME 30 through the (e)NB 20.

In steps 12 to 15 of FIG. 4, a "modify bearer request" message may be transmitted from the MME 30 to the S-GW 40 and the MME 30 may receive a "modify bearer response" message from the S-GW 40. Steps 13 to 14 are optional and a bearer between the S-GW 40 and the P-GW 50 may be updated as necessary.

Step 16 of FIG. 4 is optional. If updated information of the UE 20 needs to be stored in an HSS 70, the MME 30 may perform an HSS registration process through a "notify request" message and receive a "notify response" message from the HSS 70.

Embodiment 2

Embodiment 2 relates to a method of releasing/deactivating a previously established PDN connection and re-establishing a new PDN connection with a newly configured priority level if the priority level of a terminal configured with multiple priorities is changed.

In this case, if the priority level is changed, an MM back-off timer may be stopped and SM back-off timer(s) may be stopped.

Referring to FIG. 4 again, in step 0, a network (e.g., an MME 30) may transmit, to the UE 10, a NAS configuration MO including dual priority or multiple priority configuration information of a UE 10 through an OMA DM. Thus, the UE 10 may be configured with dual priorities or multiple priorities. That is, the UE 10 may have any one of the dual priorities or any one of the multiple priorities.

If the priority of the UE 10 is changed from a relatively low priority level to a relatively high priority level and an MM back-off timer and SM back-off timer(s) run, the MM back-off timer and SM back-off timer(s) may be stopped.

In step 1 of FIG. 4, the UE 10 may release/deactivate the previously established PDN connection before the priority is changed. Thereafter, the UE 10 may send a PDN connection request message to the MME 30 through an (e)NB 20. At this time, the PDN connection request message may include APN information of a new PDN connection desired by the UE 10.

For example, the UE 10 may transmit the PDN connection request for a new PDN connection (a PDN connection having the changed priority level) having the same APN information as the previously established PDN connection (the PDN connection having the priority before change).

Steps 2 to 16 of FIG. 4 of Embodiment 2 are equal to steps 2 to 16 of FIG. 4 of Embodiment 1 and a description thereof will be omitted for clarity.

Embodiment 3

Embodiment 3 relates to a method of maintaining a previously established PDN connection with a previously configured priority level and establishing a new PDN connection with a newly configured priority level if the priority level of a terminal configured with multiple priorities is changed.

In this case, if the priority level is changed, an MM back-off timer may not be stopped and SM back-off timer(s) may not be stopped.

Referring to FIG. 4 again, in step 0, a network (e.g., an MME 30) may transmit, to the UE 10, a NAS configuration MO including dual priority or multiple priority configuration information of a UE 10 through an OMA DM. Thus, the UE 10 may be configured with dual priorities or multiple priorities. That is, the UE 10 may have any one of the dual priorities or any one of the multiple priorities.

Even when running MM back-off timer is present, the UE 10 may not stop the MM back-off timer regardless of priority change. For example, even when the MM back-off timer runs, the UE may make an MM signaling request (e.g., an attach request, a TAU/RAU request or a service request), which does not indicate a low priority (or is configured with a non-low/normal/high priority).

In addition, even when running SM back-off timer(s) is present, the UE 10 may not stop the SM back-off timer(s) regardless of priority change. Even when the SM back-off timer for a specific APN runs, the UE may transmit an SM signaling request (e.g., a PN connection request, a bearer resource modification request, a bearer resource allocation request, etc.) having a normal (that is, non-low) priority for the same APN.

Further, the UE 10 may establish a new PDN connection configured with the changed priority while maintaining the PDN connection established before changing the priority with the priority configured before change.

More specifically, in step 1 of FIG. 4, while the previously established PDN connection is maintained, the UE 10 may send a PDN connection request message to the MME 30 through an (e)NB 20. At this time, the PDN connection request message may include APN information of a new PDN connection desired by the UE 10.

For example, the UE 10 may transmit the PDN connection request for a new PDN connection (a PDN connection having the changed priority level) having the same APN information and PDN type as the previously established PDN connection (the PDN connection having the priority before change).

Alternatively, the UE may transmit the PDN connection request for a new PDN connection (a PDN connection having the changed priority level) having APN information different from that of the previously established PDN connection (the PDN connection having the priority before change).

Steps 2 to 16 of FIG. 4 of Embodiment 3 are equal to steps 2 to 16 of FIG. 4 of Embodiment 1 and a description thereof will be omitted for clarity.

Embodiment 4

Embodiment 4 relates to a method of releasing/deactivating a previously established PDN connection and re-establishing a new PDN connection with a newly configured priority level if the priority level of a terminal configured with multiple priorities is changed.

In this case, if the priority level is changed, an MM back-off timer may not be stopped and SM back-off timer(s) may not be stopped.

Referring to FIG. 4 again, in step 0, a network (e.g., an MME 30) may transmit, to the UE 10, a NAS configuration MO including dual priority or multiple priority configuration information of a UE 10 through an OMA DM. Thus, the UE 10 may be configured with dual priorities or multiple priorities. That is, the UE 10 may have any one of the dual priorities or any one of the multiple priorities.

Even when running MM back-off timer is present, the UE 10 may not stop the MM back-off timer regardless of priority change. For example, even when the MM back-off timer runs, the UE may make an MM signaling request (e.g., an attach request, a TAU/RAU request or a service request), which does not indicate a low priority (or is configured with a non-low/normal/high priority).

In addition, even when running SM back-off timer(s) is present, the UE 10 may not stop the SM back-off timer(s) regardless of priority change. Even when the SM back-off timer for a specific APN runs, the UE may transmit an SM signaling request (e.g., a PN connection request, a bearer resource modification request, a bearer resource allocation request, etc.) having a normal (that is, non-low) priority for the same APN.

Further, in step 1 of FIG. 4, the UE 10 may release/deactivate the previously established PDN connection before the priority is changed. Thereafter, the UE 10 may send a PDN connection request message to the MME 30 through an (e)NB 20. At this time, the PDN connection request message may include APN information of a new PDN connection desired by the UE 10.

For example, the UE 10 may transmit the PDN connection request for a new PDN connection (a PDN connection having the changed priority level) having the same APN information as the previously established PDN connection (the PDN connection having the priority before change).

Steps 2 to 16 of FIG. 4 of Embodiment 4 are equal to steps 2 to 16 of FIG. 4 of Embodiment 1 and a description thereof will be omitted for clarity.

Embodiment 5

Embodiment 5 relates to a method of maintaining a previously established PDN connection with a previously configured priority level and establishing a new PDN connection with a newly configured priority level if the priority level of a terminal configured with multiple priorities per application level is changed per application.

In this case, if the priority level is changed, an MM back-off timer may be stopped but SM back-off timer(s) may not be stopped.

Figure 5:
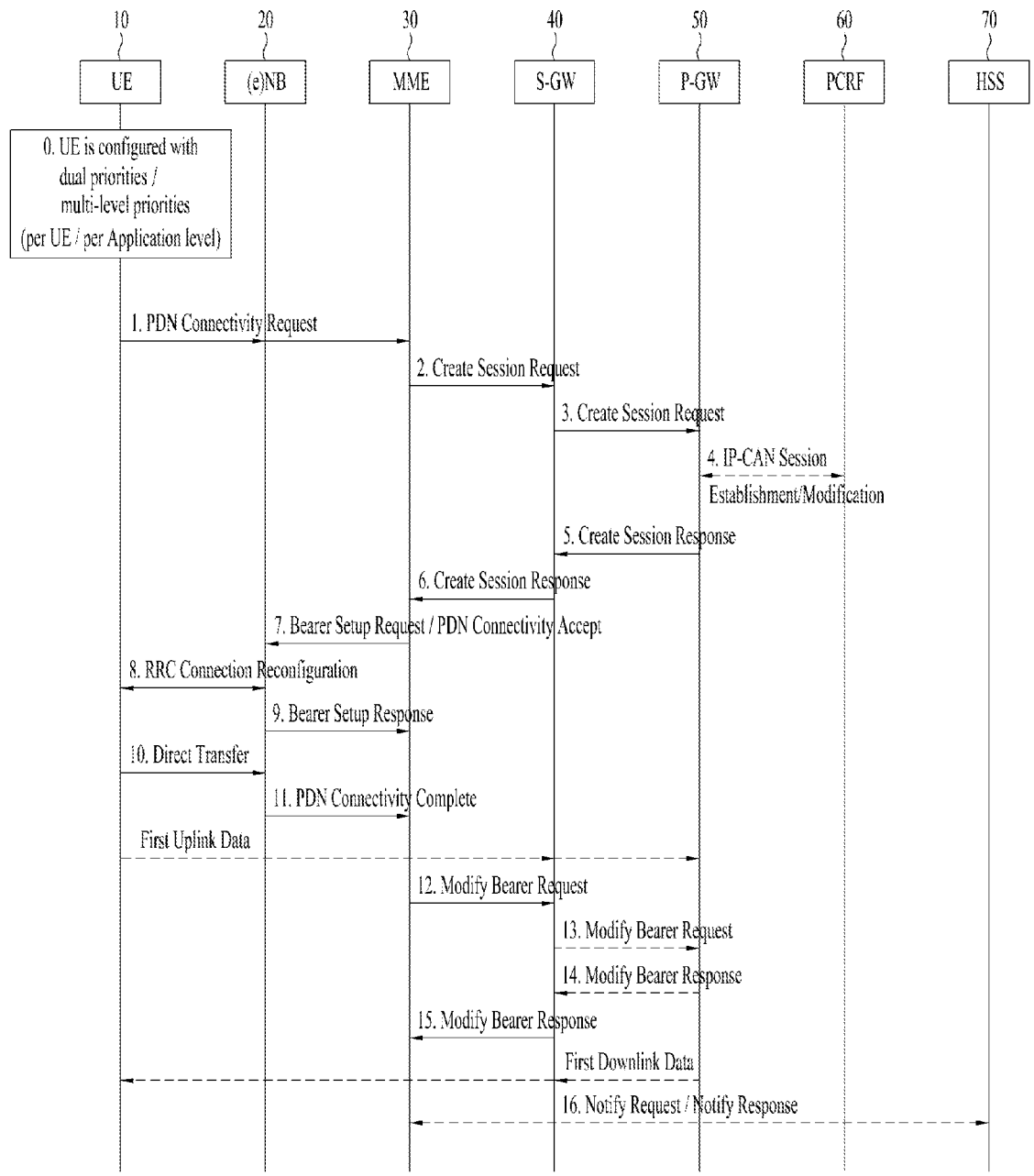
FIG. 5 is a diagram illustrating a PDN connection process according to another example of the present invention.

FIG. 5 is a diagram illustrating a PDN connection process according to another example of the present invention.

In step 0 of FIG. 5, a UE may be configured with dual priorities or multiple priorities per application level by an upper layer (e.g., an application layer). In addition, any one of the dual priorities or any one of the multiple priority levels may be configured per application. Thus, if a plurality of applications is associated with the UE, different priority levels may be set with respect to the plurality of applications.

If the priority is changed per application and a running MM back-off timer is present, the UE 10 may stop the MM back-off timer according to the changed priority level. Here, a determination as to whether the MM back-off timer is applied/stopped according to the priority level may be statically made according to application or may be dynamically made based on subscriber data, operator policy or preference. For example, the MM back-off timer may be preconfigured not to be stopped if the priority of a specific application is level-1 and to be stopped if the priority of the specific application is level-2. In this case, the MM back-off timer may not be stopped if the changed priority of the specific application is level-1 but may be stopped if the changed priority of the specific application is level-2.

Even when running SM back-off timer(s) is present, the UE 10 may not stop the SM back-off timer(s) regardless of priority change. For example, even when the SM back-off timer for a specific APN runs, an SM signaling request (e.g., a PDN connection request, a bearer resource modification request, a bearer resource allocation request, etc.) having a normal (that is, non-low) priority for the same APN may be transmitted.

More specifically, in step 1 of FIG. 5, while maintaining the previously established PDN connection, the UE 10 may send a PDN connection request message to an MME 30 through an (e)NB 20. At this time, the PDN connection request message may include APN information of a new PDN connection desired by the UE 10.

For example, the UE 10 may transmit the PDN connection request for a new PDN connection (a PDN connection having the changed priority level) having the same APN information and PDN type as the previously established PDN connection (the PDN connection having the priority before change).

Alternatively, the UE 10 may transmit the PDN connection request for a new PDN connection (a PDN connection having the changed priority level) having APN information different from the previously established PDN connection (the PDN connection having the priority before change).

Steps 2 to 16 of FIG. 5 of Embodiment 5 are equal to steps 2 to 16 of FIG. 4 of Embodiment 1 and a description thereof will be omitted for clarity.

Embodiment 6

Embodiment 6 relates to a method of releasing/deactivating a previously established PDN connection and re-establishing a new PDN connection with a newly configured priority level if the priority level of a terminal configured with multiple priorities per application level is changed per application.

In this case, if the priority level is changed, an MM back-off timer may be stopped and SM back-off timer(s) may be stopped.

Referring to FIG. 5 again, a UE may be configured with dual priorities or multiple priorities per application level by an upper layer (e.g., an application layer). In addition, any one of the dual priorities or any one of the multiple priority levels may be configured per application. Thus, if a plurality of applications is associated with the UE, different priority levels may be set with respect to the plurality of applications.

If the priority is changed per application and a running MM back-off timer is present, the UE 10 may stop the MM back-off timer according to the changed priority level. Here, a determination as to whether the MM back-off timer is applied/stopped according to the priority level may be statically made according to application or may be dynamically made based on subscriber data, operator policy or preference. For example, the MM back-off timer may be preconfigured not to be stopped if the priority of a specific application is level-1 and to be stopped if the priority of the specific application is level-2. In this case, the MM back-off timer may not be stopped if the changed priority of the specific application is level-1 and may be stopped if the changed priority of the specific application is level-2.

If the priority is changed per application and a running SM back-off timer is present, the UE 10 may stop the SM back-off timer according to the changed priority level. Here, a determination as to whether the SM back-off timer is applied/stopped according to the priority level may be statically made according to application or may be dynamically made based on subscriber data, operator policy or preference. For example, the SM back-off timer may be preconfigured not to be stopped if the priority of a specific application is level-1 and level-2 and to be stopped if the priority of the specific application is level-3 or more. In this case, the SM back-off timer may not be stopped if the changed priority of the specific application is level-2 and may be stopped if the changed priority of the specific application is level-3.

In step 1 of FIG. 5, the UE may release/deactivate the PDN connection established before the priority is changed. Thereinafter, the UE 10 may send a PDN connection request message to an MME 30 through an (e)NB 20. At this time, the PDN connection request message may include APN information of a new PDN connection desired by the UE 10.

For example, the UE 10 may transmit the PDN connection request for a new PDN connection (a PDN connection having the changed priority level) having the same APN information as the previously established PDN connection (the PDN connection having the priority before change).

Steps 2 to 16 of FIG. 5 of Embodiment 6 are equal to steps 2 to 16 of FIG. 4 of Embodiment 1 and a description thereof will be omitted for clarity.

Embodiment 7

Embodiment 7 relates to a method of maintaining a previously established PDN connection with a previously configured priority level and establishing a new PDN connection with a newly configured priority level if the priority level of a terminal configured with multiple priorities per application level is changed per application.

In this case, if the priority level is changed, an MM back-off timer may not be stopped and SM back-off timer(s) may not be stopped.

Referring to FIG. 5 again, in step 0, a UE may be configured with dual priorities or multiple priorities per application level by an upper layer (e.g., an application layer). In addition, any one of the dual priorities or any one of the multiple priority levels may be configured per application. Thus, if a plurality of applications is associated with the UE, different priority levels may be set with respect to the plurality of applications.

Even when running MM back-off timer is present, the UE 10 may not stop the MM back-off timer regardless of priority change. For example, even when the MM back-off timer runs, the UE may make an MM signaling request (e.g., an attach request, a TAU/RAU request or a service request), which does not indicate a low priority (or is configured with a non-low/normal/high priority).

In addition, even when running SM back-off timer(s) is present, the UE 10 may not stop the SM back-off timer(s) regardless of priority change. Even when the SM back-off timer for a specific APN runs, the UE may transmit an SM signaling request (e.g., a PN connection request, a bearer resource modification request, a bearer resource allocation request, etc.) having a normal (that is, non-low) priority for the same APN.

In step 1 of FIG. 5, while the previously established PDN connection is maintained, the UE 10 may send a PDN connection request message to the MME 30 through an (e)NB 20. At this time, the PDN connection request message may include APN information of a new PDN connection desired by the UE 10.

For example, the UE 10 may transmit the PDN connection request for a new PDN connection (a PDN connection having the changed priority level) having the same APN information and PDN type as the previously established PDN connection (the PDN connection having the priority before change).

Alternatively, the UE may transmit the PDN connection request for a new PDN connection (a PDN connection having the changed priority level) having APN information different from that of the previously established PDN connection (the PDN connection having the priority before change).

Steps 2 to 16 of FIG. 5 of Embodiment 7 are equal to steps 2 to 16 of FIG. 4 of Embodiment 1 and a description thereof will be omitted for clarity.

Embodiment 8

Embodiment 8 relates to a method of releasing/deactivating a previously established PDN connection and re-establishing a new PDN connection with a newly configured priority level if the priority level of a terminal configured with multiple priorities per application level is changed per application.

In this case, if the priority level is changed, an MM back-off timer may not be stopped but SM back-off timer(s) may be stopped.

Referring to FIG. 5 again, in step 0, a UE may be configured with dual priorities or multiple priorities per application level by an upper layer (e.g., an application layer). In addition, any one of the dual priorities or any one of the multiple priority levels may be configured per application. Thus, if a plurality of applications is associated with the UE, different priority levels may be set with respect to the plurality of applications.

Even when running MM back-off timer is present, the UE 10 may not stop the MM back-off timer regardless of priority change. For example, even when the MM back-off timer runs, the UE may make an MM signaling request (e.g., an attach request, a TAU/RAU request or a service request), which does not indicate a low priority (or is configured with a non-low/normal/high priority).

If the priority is changed per application and a running SM back-off timer is present, the UE 10 may stop the SM back-off timer according to the changed priority level. Here, a determination as to whether the SM back-off timer is applied/stopped according to the priority level may be statically made according to application or may be dynamically made based on subscriber data, operator policy or preference. For example, the SM back-off timer may be preconfigured not to be stopped if the priority of a specific application is level-1 and level-2 and to be stopped if the priority of the specific application is level-3 or more. In this case, the SM back-off timer may not be stopped if the changed priority of the specific application is level-2 but may be stopped if the changed priority of the specific application is level-3.

In step 1 of FIG. 5, the UE may release/deactivate the PDN connection established before the priority is changed. Thereinafter, the UE 10 may send a PDN connection request message to an MME 30 through an (e)NB 20. At this time, the PDN connection request message may include APN information of a new PDN connection desired by the UE 10.

For example, the UE 10 may transmit the PDN connection request for a new PDN connection (a PDN connection having the changed priority level) having the same APN information as the previously established PDN connection (the PDN connection having the priority before change).

Steps 2 to 16 of FIG. 5 of Embodiment 8 are equal to steps 2 to 16 of FIG. 4 of Embodiment 1 and a description thereof will be omitted for clarity.

Embodiment 9

Embodiment 9 relates to a method of releasing/deactivating a previously established PDN connection and re-establishing a new PDN connection with a newly configured priority level if the priority level of a terminal configured with multiple priorities per application level is changed per application.

In this case, if the priority level is changed, an MM back-off timer may not be stopped and SM back-off timer(s) may not be stopped.

Referring to FIG. 5 again, in step 0, a UE may be configured with dual priorities or multiple priorities per application level by an upper layer (e.g., an application layer). In addition, any one of the dual priorities or any one of the multiple priority levels may be configured per application. Thus, if a plurality of applications is associated with the UE, different priority levels may be set with respect to the plurality of applications.

Even when running MM back-off timer is present, the UE 10 may not stop the MM back-off timer regardless of priority change. For example, even when the MM back-off timer runs, the UE may make an MM signaling request (e.g., an attach request, a TAU/RAU request or a service request), which does not indicate a low priority (or is configured with a non-low/normal/high priority).

In addition, even when running SM back-off timer(s) is present, the UE 10 may not stop the SM back-off timer(s)

regardless of priority change. Even when the SM back-off timer for a specific APN runs, the UE may transmit an SM signaling request (e.g., a PN connection request, a bearer resource modification request, a bearer resource allocation request, etc.) having a normal (that is, non-low) priority for the same APN.

Further, in step 1 of FIG. 5, the UE may release/deactivate the PDN connection established before the priority is changed. Thereinafter, the UE 10 may send a PDN connection request message to an MME 30 through an (e)NB 20. At this time, the PDN connection request message may include APN information of a new PDN connection desired by the UE 10.

For example, the UE 10 may transmit the PDN connection request for a new PDN connection (a PDN connection having the changed priority level) having the same
APN information as the previously established PDN connection (the PDN connection having the priority before change).

Steps 2 to 16 of FIG. 5 of Embodiment 9 are equal to steps 2 to 16 of FIG. 4 of Embodiment 1 and a description thereof will be omitted for clarity.

The above-described embodiments of the present invention may be independently applied or two or more of the above-described embodiments may be simultaneously applied.

In addition, although the above-described examples of the present invention are applied to a wireless communication service of an MTC method, the principle of the present invention is equally applicable to operation according to multiple priorities in a general wireless communication system, PDN connection operation when a priority is changed, control operation of a back-off timer, etc.

According to the above-described embodiments of the present invention, it is possible to prevent unnecessary delay in a service/communication between a terminal and a network, to prevent network resources from being unnecessarily wasted, and to improve user experience.

Figure 6:
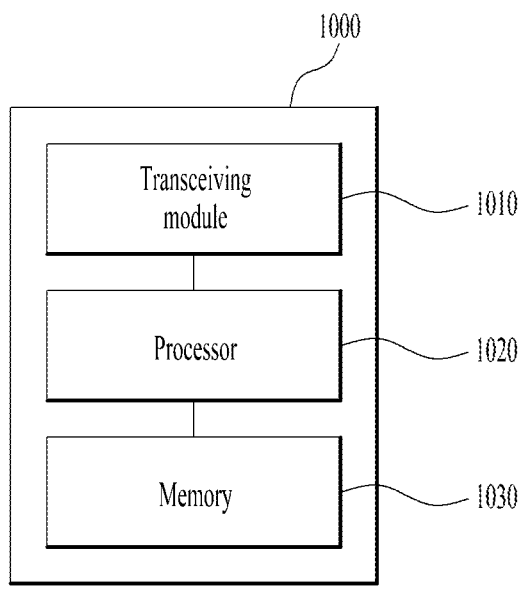
FIG. 6 is a diagram showing the configuration of a terminal according to an exemplary embodiment of the present invention.

FIG. 6 is a diagram showing the configuration of a terminal according to an exemplary embodiment of the present invention.

Referring to FIG. 6, the terminal 1000 according to the present invention may include a transceiving module 1010, a processor 1020 and a memory 1030. The transceiving module 101 may be configured to transmit various signals, data and information to an external device (e.g., a network node, another terminal, a server, etc.) and receive various signals, data and information from an external device (e.g., a network node, another terminal, a server, etc.). The processor 1020 may control overall operation of the terminal 1000 and the terminal 1000 may be configured to perform a function for processing information transmitted or received to or from an external device. The memory 1030 may store the processed information for a predetermined time and may be replaced by a buffer (not shown).

The terminal 1000 according to the embodiment of the present invention may be configured to establish a PDN connection if multiple priorities are configured. The processor 1020 of the terminal 1000 may be configured to establish a first PDN connection set to a first priority level (e.g., a low priority level (or a non-low priority level)). In addition, the processor 1020 may determine whether a second PDN connection set to a second priority level (e.g., a non-low priority level (or a low priority level)) is requested to be established while the first PDN connection set to the first priority level is present. If it is determined that the first PDN connection set to the first priority level is present and the second PDN connection set to the second priority level is requested to be established, the processor 1020 may be configured to transmit a PDN connection request message for the second PDN connection set to the second priority level using the transceiving module 1010 while maintaining the first PDN connection set to the first priority level. In some cases, the processor 1020 may be configured to transmit a PDN connection request for the second PDN connection after the second PDN connection is deactivated.

While the first PDN connection is maintained or after the first PDN connection is deactivated, a PDN connection request message for the second PDN connection may be transmitted with respect to the same APN as the APN of the first PDN connection.

In addition, even when the SM back-off timer runs with respect to the APN of the first PDN connection (that is, the SM back-off timer is not stopped), transmission of the PDN connection request message for the second PDN connection may be allowed with respect to the same APN as the APN of the first PDN connection.

The terminal 1000 according to another embodiment of the present invention may be configured to control a back-off timer if multiple priorities are configured. The processor 1020 of the terminal 1000 may be configured to transmit a first NAS request message set to a first priority level (e.g., a low priority level) using the transceiving module 1010. The processor 1020 may be configured to start the back-off timer (an MM back-off timer and/or an SM back-off timer) configured by a network if the first NAS request message is rejected by the network. In addition, the processor 1020 may be configured to transmit a second NAS request message which is not set to the first priority level (e.g., set to a non-low priority level) using the transceiving unit 1010 without stopping the back-off timer, while the back-off timer runs.

If the first NAS request message to the first priority level is an attach request message, a TAU request message, a service request message, etc., the back-off timer may be an MM back-off timer. At this time, even when the MM back-off timer runs, an attach process, a TAU process, a service request process, etc. may begin without stopping the MM back-off timer.

If the first NAS request message set to the first priority level is a PDN connection request message, a bearer modification request message, a bearer resource allocation message, etc., the back-off timer may be an SM back-off timer. At this time, even when the SM back-off timer runs, transmission of a PDN connection request message, a bearer modification request message, a bearer resource allocation message, etc. may be allowed without stopping the SM back-off timer.

The embodiments of the present invention may be independently or simultaneously applied to the detailed configuration of the terminal 1000 and a description thereof will be omitted for clarity.

According to the present invention, it is possible to provide a method for controlling a packet data network (PDN) connection with respect to a terminal having multiple priorities. According to the present invention, it is possible to provide a method for controlling a back-off timer (BOT) with respect to terminal having multiple priorities.

The embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The embodiments of the present invention are applicable to various mobile communication systems.

What is claimed is:

1. A method of controlling a back-off timer in a terminal configured with multiple priorities, the method comprising:
    transmitting, by the terminal to a network, a first non-access stratum (NAS) request message set to a first priority level;
    starting a session management (SM) back-off timer with a wait time value configured by a network, when the first NAS request message is rejected by the network, if the first NAS request message indicates the first priority level which corresponds to the case in which the terminal is configured with a NAS signaling low priority; and
    transmitting, by the terminal to the network, a second NAS request message, which is not set to the first priority level, while the session management (SM) back-off timer is running,
    wherein the SM back-off timer runs with respect to a specific access point name (APN), and
    wherein when the second NAS message is a packet data network (PDN) connection request message, the second NAS message is sent to the specific APN,
    wherein when the second NAS message is a bearer modification request message or a bearer resource allocation message, the second NAS message is sent for an established PDN connection, which is not set to the first priority level, when the SM back-off timer runs with respect to the specific access point name (APN), and
    wherein the multiple priorities of the terminal are set by a non-access stratum (NAS) configuration management object (MO).

2. The method according to claim 1, wherein the second NAS request message, which is not set to the first priority level, is transmitted without stopping the session management (SM) back-off timer.

3. The method according to claim 1, wherein:
    the first NAS request message set to the first priority level is at least one of a packet data network (PDN) connection request message, a bearer modification request message or a bearer resource allocation message.

4. The method according to claim 1, wherein the SM back-off timer is a back-off timer operating based on a bearer ID.

5. The method according to claim 1, wherein the priority of the terminal is a non-access stratum (NAS) priority.

6. The method according to claim 1, wherein the terminal is a machine type communication (MTC) device.

7. The method according to claim 1, wherein the terminal configured with the multiple priorities is a terminal configured with dual priorities.

8. A terminal for controlling a back-off timer when multiple priorities are configured, the terminal comprising:
    a transceiver; and
    a processor that:
    controls the transceiver to transmit to a network a first non-access stratum (NAS) request message set to a first priority level,
    starts a session management (SM) back-off timer with a wait time value configured by a network, when the first NAS request message is rejected by the network, if the first NAS request message indicates the first priority level which corresponds to the case in which the terminal is configured with a NAS signaling low priority, and
    controls the transceiver to transmit to the network a second NAS request message, which is not set to the first priority level, while the session management (SM) back-off timer is running,
    wherein the SM back-off timer runs with respect to a specific access point name (APN), and
    wherein when the second NAS message is a packet data network (PDN) connection request message, the second NAS message is sent to the specific APN,
    wherein when the second NAS message is a bearer modification request message or a bearer resource allocation message, the second NAS message is sent for an established PDN connection, which is not set to the first priority level, when the SM back-off timer runs with respect to the specific access point name (APN), and wherein the multiple priorities of the terminal are set by a non-access stratum (NAS) configuration management object (MO).

\* \* \* \* \*